United States Patent
Perron et al.

(10) Patent No.: US 10,591,385 B2
(45) Date of Patent: Mar. 17, 2020

(54) METHOD AND SYSTEM FOR MULTI-FIBER CABLE TESTING

(71) Applicant: EXFO Inc., Quebec (CA)

(72) Inventors: Stephane Perron, Quebec (CA); Daniel Gariepy, Quebec (CA); Nicolas Caron, Quebec (CA); Robert Baribault, Quebec (CA); Vincent Racine, Quebec (CA)

(73) Assignee: EXFO Inc., Quebec (CA)

( * ) Notice: Subject to any disclaimer, the term of this patent is extended or adjusted under 35 U.S.C. 154(b) by 0 days.

(21) Appl. No.: 15/950,709

(22) Filed: Apr. 11, 2018

(65) Prior Publication Data

US 2019/0170610 A1 Jun. 6, 2019

Related U.S. Application Data

(60) Provisional application No. 62/593,595, filed on Dec. 1, 2017.

(51) Int. Cl.
*G01M 11/00* (2006.01)
*G02B 6/38* (2006.01)
*H04B 10/073* (2013.01)

(52) U.S. Cl.
CPC ............ *G01M 11/33* (2013.01); *G02B 6/385* (2013.01); *H04B 10/0731* (2013.01); *G02B 6/3885* (2013.01)

(58) Field of Classification Search
CPC .... G01M 11/088; G01M 11/30; G01M 11/31; G01M 11/37; G01M 11/39;

(Continued)

(56) References Cited

U.S. PATENT DOCUMENTS 6,784,802 B1 8/2004 Stanescu
7,349,605 B2 3/2008 Noonan et al.
(Continued)

FOREIGN PATENT DOCUMENTS

CN 102176685 9/2011
CN 202978987 6/2013
(Continued)

OTHER PUBLICATIONS

Kingfisher International—Brochure KI-TK800 Series—Hand Held MPO Visual Cable Verifier, Aug. 8, 2017. https://www.kingfisherfiber.com/media/1957/brochure_ki-tk800.pdf.
(Continued)

*Primary Examiner* — Gordon J Stock, Jr.
(74) *Attorney, Agent, or Firm* — Helene Chotard

(57) ABSTRACT

There is provided a method, system and image capture device for determining a polarity of a multi-fiber cable link comprising a plurality of optical fiber links each connected between a first multi-fiber connector and a second multi-fiber connector, according to said polarity. Test light is injected into one or more of the optical fiber links via corresponding injection ports of the first multi-fiber connector, in accordance with a defined injection pattern; at least one polarity-testing image of the second multi-fiber connector is generated in which test light exiting at least one of the optical fiber links through one or more exit ports of the second multi-fiber connector is imaged as one or more spotlight spots in the polarity-testing image; and the polarity of the multi-fiber cable link is determined based on a pattern of said one or more spotlight spots in said polarity-testing image.

26 Claims, 9 Drawing Sheets

(58) Field of Classification Search
CPC .......... G01M 11/3109; G01M 11/3118; G01M 11/3127; G01M 11/3136; G01M 11/3145; G01M 11/3154; G01M 11/3163; G01M 11/3172; G01M 11/3181; G01M 11/319; G01M 11/331; G01M 11/332; G01M 11/333; G01M 11/334; G01M 11/335; G01M 11/336; G01M 11/337; G01M 11/338; G02B 6/385; G02B 6/43
USPC ....................................................... 356/73.1
See application file for complete search history.

(56) References Cited

U.S. PATENT DOCUMENTS

| | | | |
|---|---|---|---|
| 7,565,055 B2 | 7/2009 | Lu et al. | |
| 7,674,048 B2* | 3/2010 | Burnett | G02B 6/262 |
| | | | 385/88 |
| 7,993,143 B2 | 8/2011 | Nordin et al. | |
| 7,994,929 B2 | 8/2011 | Nordin | |
| 8,036,504 B2 | 10/2011 | Lu | |
| 8,041,178 B2 | 10/2011 | Lu et al. | |
| 8,267,706 B2 | 9/2012 | Patel et al. | |
| 8,649,651 B2 | 2/2014 | German et al. | |
| 8,670,110 B2 | 3/2014 | Schillab et al. | |
| 8,692,984 B2 | 8/2014 | Schell et al. | |
| 9,171,209 B2 | 10/2015 | Townend et al. | |
| 9,378,639 B2 | 6/2016 | Brown et al. | |
| 9,435,713 B2 | 9/2016 | Collier et al. | |
| 9,518,892 B1 | 12/2016 | Schell | |
| 9,742,633 B2 | 8/2017 | Koziy et al. | |
| 9,824,474 B2 | 11/2017 | Smith et al. | |
| 9,905,089 B2 | 2/2018 | Thompson | |
| 10,012,563 B1* | 7/2018 | Wang | G01M 11/3136 |
| 10,025,039 B1* | 7/2018 | Cummings | G01M 11/088 |
| 10,241,277 B2* | 3/2019 | Cummings | G01M 11/088 |
| 10,288,524 B2* | 5/2019 | Leclerc | G01M 11/3136 |
| 10,302,529 B2* | 5/2019 | Schell | G01M 11/3181 |
| 10,361,780 B2 | 7/2019 | Aoyama et al. | |
| 10,374,700 B2* | 8/2019 | Schell | G01M 11/31 |
| 10,481,041 B2* | 11/2019 | Schell | G01M 11/335 |
| 2004/0117515 A1 | 6/2004 | Sago et al. | |
| 2009/0109424 A1 | 4/2009 | Burnett et al. | |
| 2015/0092043 A1 | 4/2015 | Baribault et al. | |
| 2015/0331192 A1 | 11/2015 | Hall | |
| 2016/0041065 A1 | 2/2016 | L'Heureux et al. | |
| 2017/0003195 A1 | 1/2017 | Lafrance et al. | |
| 2017/0234767 A1* | 8/2017 | Leclerc | G01M 11/3136 |
| | | | 356/73.1 |
| 2018/0203191 A1* | 7/2018 | Cummings | G01M 11/088 |
| 2018/0266918 A1* | 9/2018 | Schell | G01M 11/3181 |
| 2018/0269967 A1* | 9/2018 | Schell | H04B 10/0795 |
| 2018/0340861 A1* | 11/2018 | Schell | G01M 11/333 |

FOREIGN PATENT DOCUMENTS

| | | | | |
|---|---|---|---|---|
| EP | 3407049 A1 * | 11/2018 | .......... | G01M 11/333 |
| EP | 3407049 A1 | 11/2018 | | |
| EP | 3 481 078 A1 | 8/2019 | | |
| JP | 2015233276 | 12/2015 | | |
| KR | 101357900 B1 | 2/2014 | | |
| WO | 2018136296 A1 | 7/2018 | | |
| WO | WO-2018136296 A1 * | 7/2018 | .......... | G01M 11/088 |

OTHER PUBLICATIONS

"MPO Visual Cable Verifier Kit", Kingfisher International, Aug. 8, 2017. https://www.kingfisherfiber.com/news/innovative-new-mpo-visual-cable-verifier-kit/.
SimpliFiber Pro, Optical Power Meter and Fiber Test Kits, Fluke Networks, 2008.
FindFiber Remote ID Source, Fluke Networks, 2009.
EXFO reinvents multifiber testing, Sep. 6, 2018, EXFO Inc., Quebec City, Canada.
Patch App & Go, Google Play, available on Jun. 22, 2019.
Pockethernet, A smartphone connected Ethernet network analyzer & cable tester that fits into your pocket, https://www.pockethernet.com, available on Dec. 31, 2018.

* cited by examiner

METHOD AND SYSTEM FOR MULTI-FIBER CABLE TESTING

CROSS-REFERENCE TO RELATED APPLICATIONS

This application claims priority under 35 USC § 119(e) of U.S. provisional patent applications 62/593,595 filed Dec. 1, 2017; the specifications of which is hereby incorporated by reference.

TECHNICAL FIELD

The present description generally relates to optical fiber characterization and testing, and more particularly, to multi-fiber cable characterization and testing, such as for polarity testing, using the image sensor of a fiber inspection probe.

BACKGROUND

Optical fiber networks lie at the core of modern telecommunication systems and infrastructures. As such, the development of reliable and accurate techniques for optical fiber characterization, inspection and testing is required to ensure network integrity and efficient signal transmission. Non-limiting examples of traditional fiber tests include optical fiber endface inspection, optical power level measurements, insertion loss and optical return loss testing, polarity determination, continuity verification, reflectance measurements, and the like.

Multi-fiber cables are commonly employed in premises optical fiber cabling, such as in data centers and other intrabuilding optical fiber networks that require high connectivity density and versatile solutions. Multi-fiber cables are mostly interconnected and connected to optical network equipment using MPO/MTP® connectors (MPO being the acronym for Multi-Fiber Push-On/Pull-Off connectors and MTP a brand name). The most common MPO/MTP® connectors are configured in a 1×12 fiber array, although 2×12, 2×16, and other fiber array configurations are also possible.

Preserving the cleanliness and quality of optical fiber endfaces forming part of multi-fiber connectors (MFC) is important for ensuring adequate network performance and maintain signal integrity. Video fiber inspection probes are commonly employed for inspecting and analyzing connectors, especially for hard-to-reach MFCs located on patch panels and bulkhead adapters. These probes are generally equipped with an optical source for illuminating the connector surface, a detector array for acquiring digital images of the connector surface, and a set of interchangeable adapter tips designed for most MFCs available on the market. The inspection results can be displayed on a suitable display unit.

Depending on the application, multi-fiber cables can be arranged in duplex or parallel configurations. In a duplex configuration, the fibers are arranged on MFCs such that each pair of adjacent fibers includes one transmitting fiber and one receiving fiber. In a parallel configuration, the transmitting fibers and the receiving fibers are physically separated into two groups of adjacent fibers on MFCs. The arrangement of receiving and transmitting fibers at an MFC defines what is referred to in the industry as the "fiber polarity" or, simply, "polarity". System connectivity requires specific combinations of duplex patch cords, multi-fiber cables and optical fiber transition modules to properly manage polarities in duplex and parallel configurations. The TIA/EIA-568-C.3 Standard defines guidelines for maintaining fiber polarity and ensuring proper continuity between transmitters and receivers.

Since various multi-fiber array configurations are possible (e.g., duplex configuration, one-plug parallel configuration, two-plug one-row parallel configuration and one-plug two-row configuration), the TIA/EIA-568-C.3 Standard defines various types of multi-fiber cables, including Type A, Type B and Type C for 1×12 multi-fiber arrangements. Type A cables are designed with a key inversion but no duplex pair twists between the end connectors. Type B cables are designed with no key inversion and no duplex pair twists. Type C cables are designed with a key inversion and with duplex pair twists. Depending on the multi-fiber array configuration, various combinations of cable types may be required or desirable. Deployment mistakes can therefore easily occur if the intended cable type arrangement is not followed (e.g., due to human error or improper labeling), therefore causing improper polarity at the multi-fiber array connections.

Characterization of multi-fiber cable links aims to ensure and maintain network performance and integrity. Tier 1 characterization can include insertion loss and cable length measurements, polarity testing for fiber arrangement and/or cable type determination, and continuity verification. These tests can be performed with an optical loss test set (OLTS), typically including an optical source at one end of the cable link under test and an optical power meter at the opposite end. While OLTS-based methods for polarity testing may have certain advantages, they also have some drawbacks and limitations, notably in terms of cost.

Based on the foregoing, challenges remain in the field of multi-fiber cable testing.

SUMMARY

The present description generally relates to techniques for characterizing and testing multi-fiber cable links. In some implementations, the present techniques provide a method, a system and an image capture device that allow for polarity detection or verification in multi-fiber array optical links. In some implementations, the present techniques can be used not only for polarity testing, but also for continuity checking, insertion loss estimation and/or connector inspection.

Throughout the present description, the term "polarity" associated with a multi-fiber cable link is meant to refer to the actual fiber arrangement in the multi-fiber cable link, which comprises a plurality of optical fiber links each connected between a first MFC at a first end, and a second MFC at a second end, according to the said fiber arrangement or "polarity". For example, the TIA/EIA-568-C.3 Standard defines various types of multi-fiber cables, including Type A, Type B and Type C for 1×12 multi-fiber cables, which define various possible "polarities" for such cables. Furthermore, serial connections of Type A, Type B and Type C cables using MFC adapters, result in different types of overall cable link arrangements and the "polarity" of such a multi-fiber cable link herein refers to the overall cable link arrangement. Similarly, "polarity testing" as used herein refers to determination of the fiber arrangement or "polarity" of a multi-fiber cable link.

In accordance with an aspect, there is provided a test method for determining a polarity of a multi-fiber cable link comprising a plurality of optical fiber links each connected between a first multi-fiber connector at a first end and a second multi-fiber connector at a second end, according to said polarity, the test method including:

injecting test light into one or more of the optical fiber links via corresponding injection ports of the first multi-fiber connector, in accordance with a defined injection pattern;

generating at least one polarity-testing image of the second multi-fiber connector in which test light exiting at least one of the optical fiber links through one or more exit ports of the second multi-fiber connector is imaged as one or more light spots in said polarity-testing image; and determining the polarity of the multi-fiber cable link based on a pattern of said one or more light spots in said polarity-testing image.

In some implementations, determining the polarity of the multi-fiber cable link can include identifying the one or more light spots in the connector surface image; determining therefrom an exit port arrangement of the detected test light; and determining the polarity of the multi-fiber cable link from the injection port arrangement and the exit port arrangement. More particularly, the determination of the exit port arrangement can be made from a mapping between the locations of the light spots—or similar recognizable features or indications—in the connector surface image and the corresponding physical locations of the exit ports on the endface of the second MFC. From the exit port arrangement thus determined and the injection port arrangement, which is known beforehand or predetermined, an input-to-output mapping of the test light across the multi-fiber cable link can be established and compared against known mappings to determine the polarity of the cable link under test.

The test light can include a number of test optical signals injected simultaneously or sequentially into a corresponding number of fiber links of the multi-fiber cable links. In some implementations, the number of test optical signals to be used for polarity testing can be varied between 1 and N, where N is equal to the number of fiber links in the cable link to be tested. Furthermore, in some implementations, the test optical signals can be generated with distinct optical characteristics, for example in terms of spectral content, amplitude modulation or power level, to produce mutually distinguishable responses, thereby defining an injection pattern.

The injection port arrangement or pattern can depend on the number and positions of the optical fiber links into which test light is injected.

In some implementations, the method can include a step of determining the continuity of the multi-fiber cable link. The step can include injecting test light into the fiber links at the first end of the cable link and detecting its presence on one or more connector surface images acquired at the second other end.

In accordance with another aspect, there is provided an image capture device for determining a polarity of a multi-fiber cable link comprising a plurality of optical fiber links each connected between a first multi-fiber connector at a first end and a second multi-fiber connector at a second end, according to said polarity, the image capture device to be used with a source assembly configured to inject test light into one or more of the optical fiber links via corresponding injection ports of the first multi-fiber connector, in accordance with a defined injection pattern, the image capture device comprising:

an image sensor configured to capture images of the second multi-fiber connector and configured to generate at least one polarity-testing image of the second multi-fiber connector in which test light exiting at least one of the optical fiber links through one or more of exit ports of the second multi-fiber connector is imaged as one or more light spots in said polarity-testing image, a pattern of said one or more light spots in said image being indicative of the polarity of the multi-fiber cable link.

In accordance with another aspect, there is provided a system comprising the above image capture device and the above source assembly.

In accordance with another aspect, there is provided a test system for determining a polarity of a multi-fiber cable link having a first MFC at a first end, and a second MFC at a second end, the multi-fiber cable link including a plurality of optical fiber links, each of which connected between the first and second MFCs according to said polarity, the test system including:

a source assembly configured to inject test light into one or more of the optical fiber links via one or more corresponding injection ports of the first MFC; and an image capture device configured to detect the test light exiting the one or more optical fiber links through one or more exit ports of the second MFC and to generate a connector surface image of the second MFC in which the detected test light is imaged as one or more light spots associated with the one or more exit ports and conveying information indicative of the polarity of the multi-fiber cable link.

Depending on the application, the source assembly can include one or a plurality of distinct optical sources for generating the test light as one or more test optical signals.

In some implementations, the image capture device includes a portable housing, an imaging system and an illumination source accommodated in the portable housing, and a probe tip configured to be coupled to the second MFC to provide an optical path between the cable link under test and the imaging system. The imaging system can include an image sensor which can be a charge-coupled device (CCD) sensor or a complementary metal-oxide-semiconductor (CMOS). Depending on the application, the probe tip may be releasably or integrally connected to the portable housing. In the former case, a set of interchangeable probe tips designed for common MFCs available on the market can be provided.

The image sensor may include or be in communication with an image processor programmed with instructions for analyzing the connector surface image in view of identifying the polarity and/or checking the continuity of the cable link under test. The analysis performed by the image processor can involve, for example, identifying the presence and/or location of the light spots in the connector surface image.

The number of distinct connector surface images required to test the polarity and continuity of a multi-fiber cable link can depend on the number of fiber endfaces that the image capture device can view in one connector surface image.

In some implementations, the image capture device can include, or be connected to, a controller which serves to control the operation of the source assembly to ensure that connector inspection and polarity detection process are performed in time according to a given order. Depending on the application, the controller can be part of the source assembly or connected to the source assembly via wired or wireless communication links, or optically via the cable link under test.

Depending on the application, the image capture device may or may not be a fiber inspection probe primarily designed and intended for evaluating the cleanliness and quality of MFCs. When it is the case, the present techniques can take advantage of the probe's capability of capturing MFC endface images not only for connector inspection, but also for polarity, continuity and, optionally, insertion loss testing, thus enhancing the functionality and versatility of the probe. Indeed, using the same instrument to perform connector inspection, polarity detection, continuity check, and, optionally, insertion loss estimation in multi-fiber cable links, such as MPO cable links, can save considerable amount of capital expenditure and operating expense.

It should be noted that other method steps may be performed prior, during or after the above-described steps. The order of one or more of the steps may also differ, and some of the steps may be omitted, repeated and/or combined, depending on the application. It should also be noted that some method steps for inspection and/or polarity, continuity and insertion loss testing can be performed using various image processing and analysis techniques, which can be implemented in hardware, software, firmware or any combination thereof.

In accordance with another aspect, there is provided a source assembly configured for use in a test system including an image capture device such as described herein.

In accordance with another aspect, there is provided an image capture device configured to use in a test system including a source assembly such as described herein. The image capture device can be, for example, a fiber inspection probe primarily designed for connector cleanliness and quality inspection.

In accordance with an aspect, there is provided a test method for determining a polarity of a multi-fiber cable link having a first MFC at a first end, and a second MFC at a second end, the multi-fiber cable link including a plurality of optical fiber links, each of which connected between the first and second MFCs according to said polarity, the test method including:
  injecting test light into one or more of the optical fiber links via one or more corresponding injection ports of the first MFC defining an injection port arrangement;
  generating a connector surface image of the second MFC in which the test light exiting the one or more of the optical fiber links through one or more exit ports of the second MFC is imaged as one or more light spots; and
  determining the polarity of the multi-fiber cable link based on the arrangement of one or more light spots in view of the injection port arrangement.

In accordance with another aspect, the present description relates to a computer readable memory storing computer executable instructions thereon that when executed by a computer perform some of the steps of the methods described herein.

The present techniques can be useful in applications where it is desirable or required to perform characterization of multi-fiber cable links in optical fiber networks. The present techniques can be field portable and implemented in various environments and settings, including field-deployed networks, manufacturing facilities for network equipment, research and development laboratories, and the like. The present techniques can be employed during the installation, activation and/or operation phases of the network, and find applications in testing, maintenance, error diagnosis and/or troubleshooting.

The present techniques for polarity testing can allow for discrimination between Type A, Type B and Type C MPO cables, although various other cable types and fiber arrangements can also be tested in other implementations. In some implementations, the present techniques can be used with MFC connectors having any number of fibers (e.g., 12, 16, 24, 32, 36 or 72 fibers) and any fiber array arrangement (e.g., 1×12, 2×12, 1×16, 2×16, 2×24 or 6×12). Depending on the application, the optical fiber links inside the multi-fiber cable links to be tested can be single-mode or multi-mode fibers.

Although MPO cables, connectors and adaptors, as well as the TIA/EIA-568-C.3 Standard are referred to throughout this document, it will be understood that the methods and systems described herein equivalently apply to other multi-fiber array conventions and that the MPO convention is employed in the present description as an illustrative example because of its wide presence in the data center and intrabuilding fiber cable industry.

Other features and advantages of the present description will become more apparent upon reading of the following non-restrictive description of specific embodiments thereof, given by way of example only with reference to the appended drawings.

BRIEF DESCRIPTION OF THE DRAWINGS

FIGS. 5A to 5C are schematics illustrating three possible communication methods between a fiber inspection probe and a source assembly of a test system for characterizing a multi-fiber cable link, wherein FIG. 5A illustrates a wired communication; FIG. 5B illustrates a wireless communication; and FIG. 5C illustrates a communication over the fiber via the multi-fiber cable link under test.

FIG. 8A and FIG. 8B are exemplary images obtained by the method of FIG. 6 and illustrating a Polarity A detection, wherein FIG. 8A represents an inspection image with overlaid additional graphical features; and FIG. 8B represents a polarity-testing image with overlaid additional graphical features.

DETAILED DESCRIPTION

Figure 1:
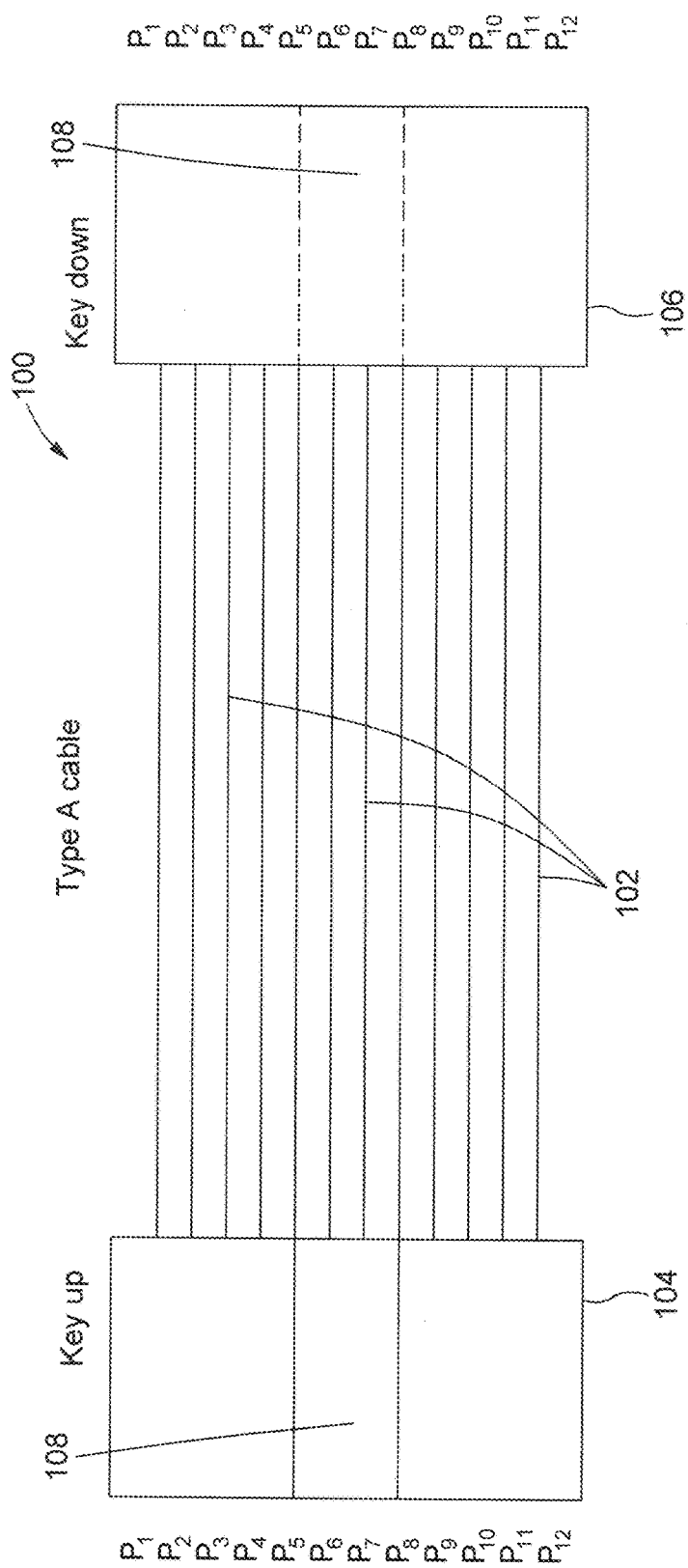
FIG. 1 (prior art) is a schematic representation of a 1×12 multi-fiber cable of Type A, as defined by the TIA/EIA-568-C.3 Standard.

In the following description, similar features in the drawings have been given similar reference numerals and, to not unduly encumber the figures, some elements may not be indicated on some figures if they were already identified in a preceding figure. It should be understood herein that the elements of the drawings are not necessarily depicted to scale, since emphasis is placed upon clearly illustrating the elements and structures of the present embodiments. It should also be noted that positional descriptors such as up and down and other like terms indicating the position or orientation of one element with respect to another element are used herein for ease and clarity of description and should, unless otherwise indicated, be taken in the context of the figures and should not be considered limiting. It will be understood that such spatially relative terms are intended to encompass different orientations in use or operation of the present embodiments, in addition to the orientations exemplified in the figures.

In the present description, and unless stated otherwise, the terms "connected", "coupled" and variants and derivatives thereof refer to any connection or coupling, either direct or indirect, between two or more elements. The connection or coupling between the elements may be mechanical, physical, operational, electrical or a combination thereof.

It is also noted, and unless otherwise mentioned, that terms such as "substantially" and "about" which modify a value, condition or characteristic of a feature of an exemplary embodiment, should be understood to mean that the value, condition or characteristic is defined within tolerances that are acceptable for proper operation of this exemplary embodiment for its intended application.

In the present description, the terms "light" and "optical" are used to refer to radiation in any appropriate region of the electromagnetic spectrum. More particularly, the terms "light" and "optical" are not limited to visible light, but can include, for example, the infrared wavelength range. For example, in some embodiments, the test optical signals generated by the source assembly for polarity and continuity verification can have a wavelength band lying somewhere in the range from about 400 nm to about 1700 nm. Those skilled in the art will understand, however, that this wavelength range is provided for illustrative purposes only and that the present techniques may operate beyond this range.

The present description generally relates to a method and a system for characterizing and testing a multi-fiber cable link including a set of optical fiber links, notably for determining or verifying the polarity of the cable link. As described in more detail below, the present techniques generally involve injecting test optical signals in at least some of the optical fiber links at one end of the cable link using one or more optical sources of a source assembly, thereby defining an injection pattern; detecting the test optical signals at the other end of the cable link using a fiber inspection probe including an image sensor for capturing connector surface images, the test optical signals being detected as light spots in image(s) captured by the image sensor; determining the polarity of the cable link based on a pattern defined by the positions and/or optical characteristics of the light spots in the captured image(s). Knowing the injection pattern of the optical source assembly, the polarity can be determined from the pattern of light spots in the image(s).

In the field of fiber optics, polarity defines the direction optical signals travel along an optical fiber. Correct polarity across a multi-fiber optical network requires that the optical path from the transmit port of any active equipment is directed to the receive port of another active equipment, regardless of the number of multi-fiber cable segments, adaptors or other components along the optical path. Failing to maintain polarity can disrupt or degrade signal transmission and cause damage to active equipment. The TIA/EIA-568-C.3 Standard defines three different polarity methods for ensuring proper continuity between transmitters and receivers in MPO-based networks—Method A, Method B and Method C—and three associated types of MPO cables—Type A, Type B and Type C. These three different cable types are known in the art and are described only briefly below, with reference to FIGS. 1 to 3.

Referring to FIG. 1, there is shown a 1×12 multi-fiber cable 100 of Type A, as defined by the TIA/EIA-568-C.3 Standard. The cable 100 includes a plurality of optical fibers 102 connected between a first MPO connector 104, at one end of the cable 100, and a second MPO connector 106, at the other end of the cable 100. Each one of the MPO connectors 104, 106 has a key 108 protruding from one of its flat sides. This key 108 serves to set the orientation in which the connector may be inserted in a corresponding receiving socket (such as that of MPO adapters). When the key 108 is on top, referred to as the key up position, the fiber ports in the connector are numbered from left to right and define fiber positions $P_1$ to $P_{12}$. In a Type A cable, there is a key inversion between the first connector 104 and the second connector 106: the key 108 is up on the first connector 104 and down on the second connector 106, or vice versa. Because of this key inversion, the fibers 102 at positions ($P_1$, $P_2$, $P_3$, $P_4$, $P_5$, $P_6$, $P_7$, $P_8$, $P_9$, $P_{10}$, $P_{11}$, $P_{12}$) on the first connector 104 respectively terminate at positions ($P_1$, $P_2$, $P_3$, $P_4$, $P_5$, $P_6$, $P_7$, $P_8$, $P_9$, $P_{10}$, $P_{11}$, $P_{12}$) on the second connector 106.

Figure 2:
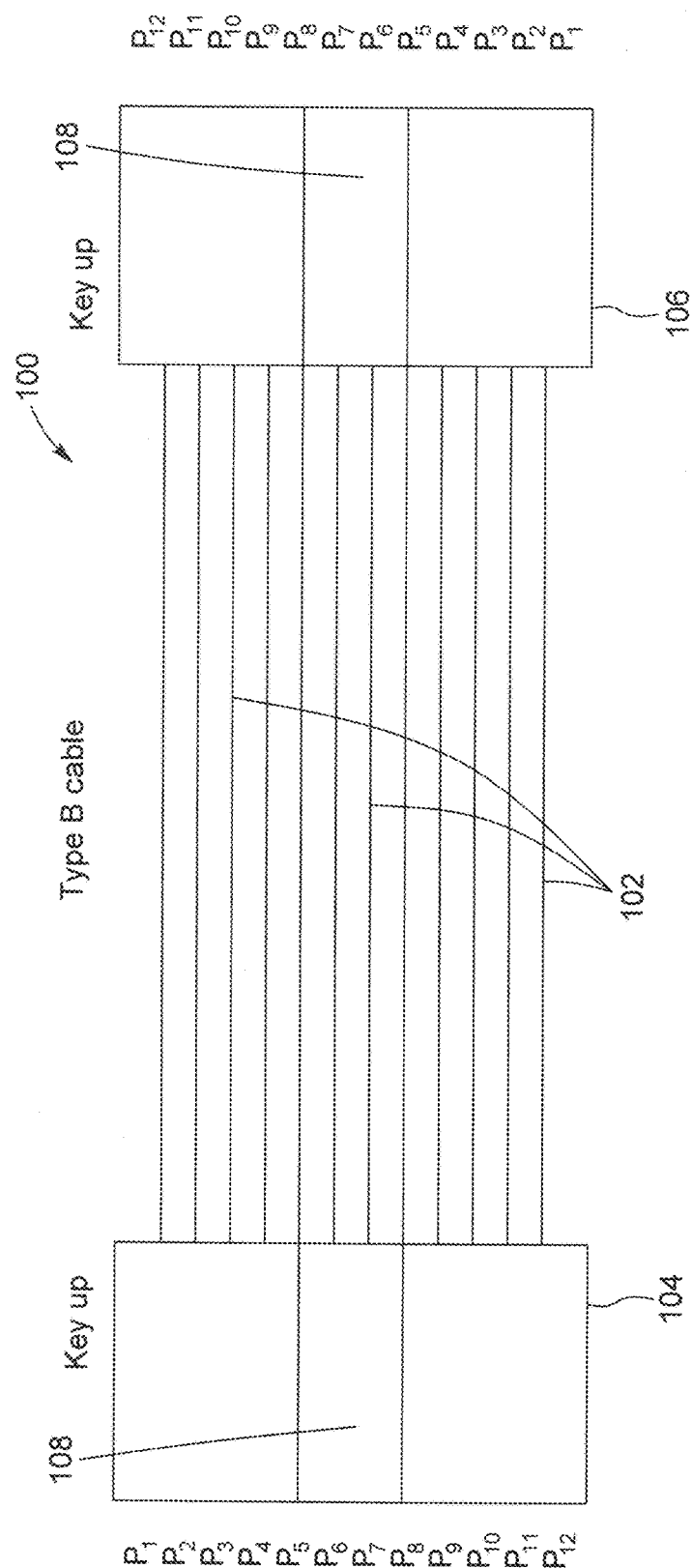
FIG. 2 (prior art) is a schematic representation of a 1×12 multi-fiber cable of Type B, as defined by the TIA/EIA-568-C.3 Standard.

Referring to FIG. 2, there is shown a 1×12 multi-fiber cable 100 of Type B, as defined by the TIA/EIA-568-C.3 Standard. Type B cables share many features with Type A cables, which will not be described again. However, unlike Type A cables, Type B cables do not have a key inversion between the first connector 104 and the second connector 106. Because of this, the fiber positions $P_1$ to $P_{12}$ are reversed from one end of the cable 100 to the other. That is, the fibers 102 at positions ($P_1$, $P_2$, $P_3$, $P_4$, $P_5$, $P_6$, $P_7$, $P_8$, $P_9$, $P_{10}$, $P_{11}$, $P_{12}$) on the first connector 104 respectively terminate at fiber positions ($P_{12}$, $P_{11}$, $P_{10}$, $P_9$, $P_8$, $P_7$, $P_6$, $P_5$, $P_4$, $P_3$, $P_2$, $P_1$) on the second connector 106.

Figure 3:
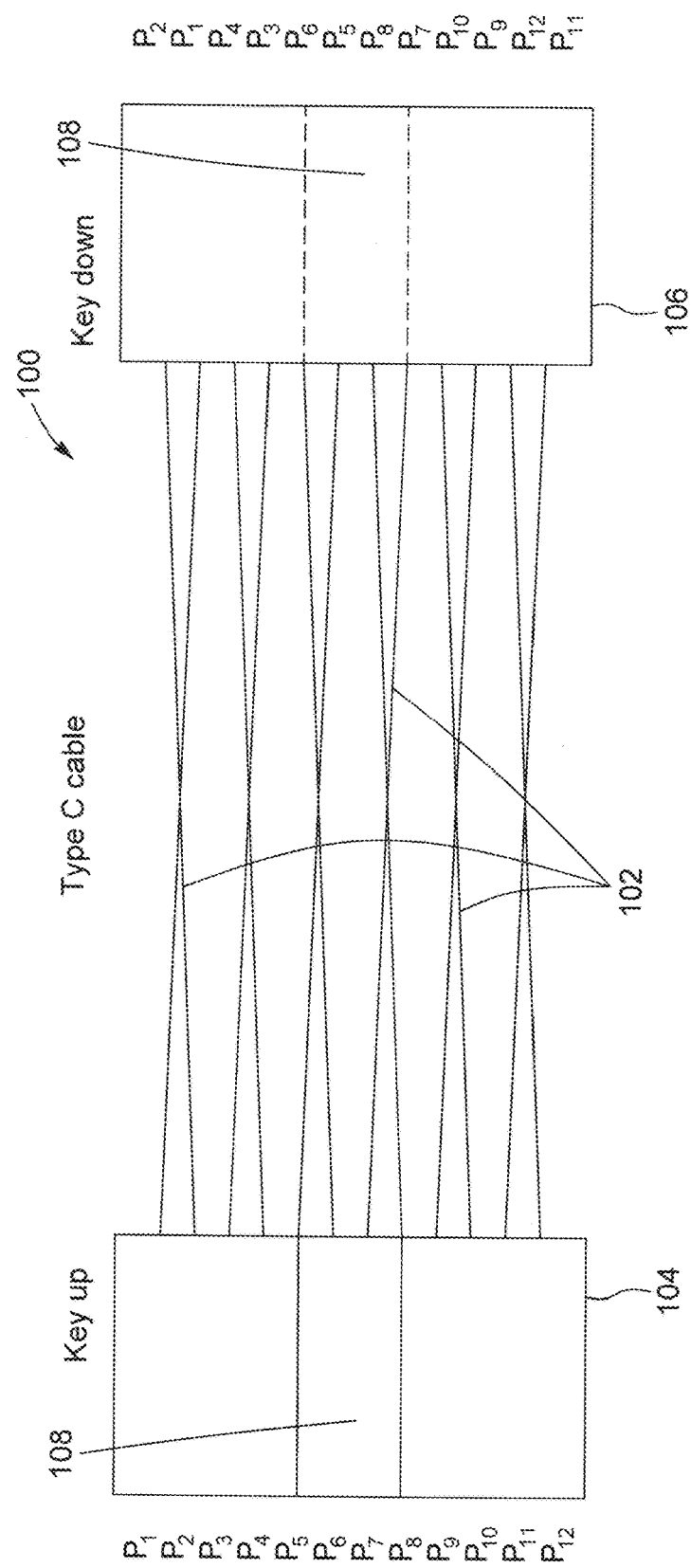
FIG. 3 (prior art) is a schematic representation of a 1×12 multi-fiber cable of Type C, as defined by the TIA/EIA-568-C.3 Standard.

Referring to FIG. 3, there is shown a 1×12 multi-fiber cable 100 of Type C, as defined by the TIA/EIA-568-C.3 Standard. Like Type A cables, Type C cables feature a key inversion between the first connector 104 and the second connector 106. However, Type C cables 100 include duplex pair twists, where pairs of adjacent fibers at the first connector 104 switch positions at the second connector 106. This means that the fibers 102 at positions ($P_1$, $P_2$, $P_3$, $P_4$, $P_5$, $P_6$, $P_7$, $P_8$, $P_9$, $P_{10}$, $P_{11}$, $P_{12}$) on the first connector 104 respectively terminate at positions ($P_2$, $P_1$, $P_4$, $P_3$, $P_6$, $P_5$, $P_8$, $P_7$, $P_{10}$, $P_9$, $P_{12}$, $P_{11}$) on the second connector 106.

In summary, Type A cables are designed with a key inversion, but no duplex pair twists; Type B cables are designed with neither a key inversion nor duplex pair twists; and Type C cables are designed with both a key inversion and duplex pair twists.

Figure 4:
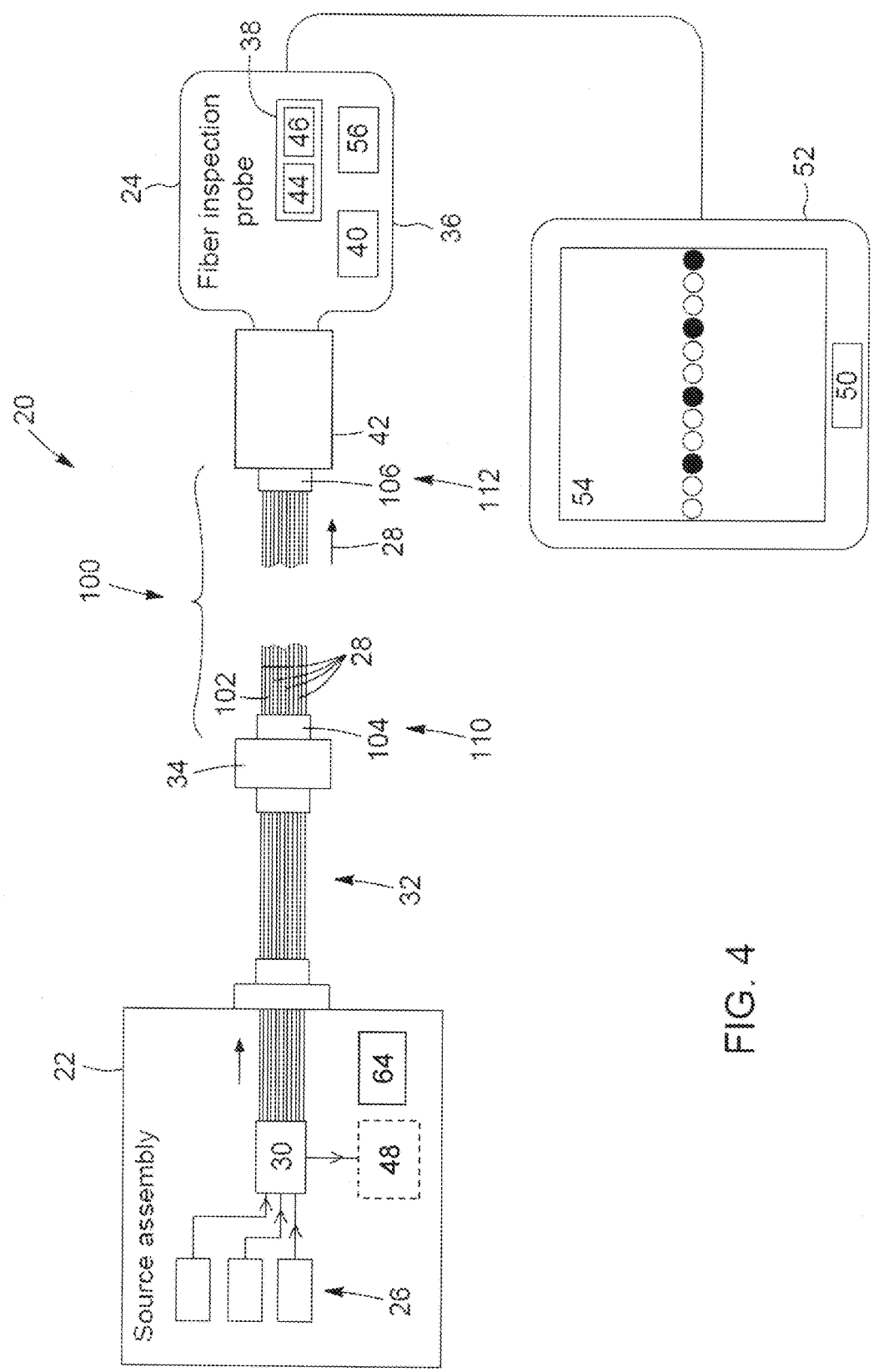
FIG. 4 is a schematic representation of a test system for characterizing a multi-fiber cable link, in accordance with one embodiment.

Referring to FIG. 4, there is illustrated an embodiment of a test system 20 for characterizing a multi-fiber cable link 100 including a plurality of optical fiber links 102, and more specifically for determining or verifying the polarity of the multi-fiber cable link 100. In the present description, the term "multi-fiber cable link" can be used interchangeably with terms "cable link under test", unless the context dictates otherwise.

The multi-fiber cable link 100 has a first end 110 connected to a first multi-fiber connector 104 and a second end 112 connected to a second multi-fiber connector 106. For definiteness, in FIG. 4, the multi-fiber cable link 100 is a 1×12 MPO cable link and the first and second multi-fiber connectors 104, 106 are MPO connectors whose fiber-ports are arranged in a 1×12 array of rows and columns. However, the present techniques can a priori be applied to any fiber number, fiber array arrangement, connector type and multi-fiber standard (i.e., MPO or not). Depending on the application, the optical fiber links 102 can be single mode or multimode fiber links.

For simplicity, the cable link under test 100 in FIG. 4 is schematically depicted as being formed of a single cable link segment extending between the first and second MFCs 104, 106. However, in practice, the cable link under test 100 may include a plurality of individual multi-fiber cable link segments serially connected to one another by appropriate MFC adapters and couplers. In this regard, it should be noted that the present techniques are primarily aimed at determining or verifying the overall polarity of the multi-fiber cable link 100, rather than those of its individual components. This means, for example, that if the multi-fiber cable link 100 is a concatenation of two type A cables connected by a Type B adaptor, then the present techniques will determine that the cable link under test 100 has an overall polarity of Type B, even though it includes no individual Type B cable link segments.

More generally, concatenations of Type A, Type B and Type C MPO cables with Type A (key-up/key-down) and Type B (key-up/key-up) MPO connector adapters can lead to four different types of overall cable link arrangements: a Type A cable arrangement with a key inversion and no pair twists; a Type B cable arrangement with neither a key inversion nor pair twists; a Type C cable arrangement with both a key inversion and pair twists; and a Type D cable arrangement (without a key inversion but with pair twists), which can be obtained from a combination of a Type B cable, a Type A adaptor and a Type C cable. In a Type D cable arrangement, fibers at positions ($P_1$, $P_2$, $P_3$, $P_4$, $P_5$, $P_6$, $P_7$, $P_8$, $P_9$, $P_{10}$, $P_{11}$, $P_{12}$) at one end terminate at positions ($P_{11}$, $P_{12}$, $P_9$, $P_{10}$, $P_7$, $P_8$, $P_5$, $P_6$, $P_3$, $P_4$, $P_1$, $P_2$) on the other end. The present techniques can discriminate between these four cable arrangements. Table I below summarizes the mappings between source ports and output ports for the four cable arrangements, in the case of 1×12 multi-fiber cable links.

TABLE I

Mappings between input ports and output ports for Type A, Type B, Type C and Type D cable arrangements.

| Input port | Output port | | | |
| --- | --- | --- | --- | --- |
| | Type A | Type B | Type C | Type D |
| 1 | 1 | 12 | 2 | 11 |
| 2 | 2 | 11 | 1 | 12 |
| 3 | 3 | 10 | 4 | 9 |
| 4 | 4 | 9 | 3 | 10 |
| 5 | 5 | 8 | 6 | 7 |
| 6 | 6 | 7 | 5 | 8 |
| 7 | 7 | 6 | 8 | 5 |
| 8 | 8 | 5 | 7 | 6 |
| 9 | 9 | 4 | 10 | 3 |
| 10 | 10 | 3 | 9 | 4 |
| 11 | 11 | 2 | 12 | 1 |
| 12 | 12 | 1 | 11 | 2 |

Referring still to FIG. 4, the test system 20 generally includes a source assembly 22 and a fiber inspection probe or microscope 24 configured to be coupled at opposite ends of the cable link under test 100. More specifically, the source assembly 22 is configured to be coupled—directly or indirectly—to the first MFC 104 at the first end 110 of the cable link 100, while the fiber inspection probe 24 is configured to be coupled to the second MFC 106 at the second end 112 of the cable link 100. The structure and operation of the source assembly 22 and the fiber inspection probe 24, as well as those of other possible components of the test system 20, are described below.

To reflect the relative positioning of the source assembly 22 and the fiber inspection probe 24 upon connection to the cable link under test 100, the first MFC 104 and the first end 110 of the multi-fiber cable link 100 may in some instances be referred to respectively as the "source" MFC and the "source" end, while the second MFC 106 and the second end 112 of the multi-fiber cable link 100 may in some instances be referred to respectively as the "probe" MFC and the "probe" end.

The source assembly 22 produces and couples test light in one or more optical fiber links of the tested multi-fiber cable link so as to produce an injection pattern. The injection pattern involves a mutually-distinguishable difference in at least one optical characteristic (e.g., spectral range, amplitude modulation, intensity level or other encoding schemes) of test light injected in the optical fiber links of the tested multi-fiber cable link.

The source assembly 22 includes at least one optical source 26 (e.g., three optical sources 26 in FIG. 4) optically coupled at the source end 110 of the cable link under test 100. The or each optical source 26 can be embodied by any appropriate device or combination of devices apt to generate test light suitable for polarity testing of multi-fiber cable links according to the present techniques. As described in more detail below, the source assembly 22 is used to inject one or more test optical signals 28 toward one, some or all of the optical fiber links 102 of the cable link to be tested 100 according to an injection pattern. The injection pattern can be defined by the input port numbers into which test optical signals are injected on the source MFC 104, and the respective optical characteristics of each test optical signal.

For example, in some implementations, the source assembly 22 can include a plurality of optical sources 26, each of which optically coupled to one or more of the optical fiber links 102 using appropriate coupling optics 30 (e.g., optical switches and/or splitters) contained inside the source assembly 22. In other implementations, the source assembly 22 can include a single optical source 26 which is used to inject test light in all the optical fiber links 102 using appropriate coupling optics (e.g., a 1×N switch or a 1×N power splitter, where N is the number of fiber links 102).

In some implementations, hybrid test cables can be used to allow testing of a multi-fiber link containing M optical fiber links using a test system including a source assembly designed for inspecting multi-fiber link containing N optical fiber links. For example, in one possible implementation, a test system including a source assembly designed for inspecting 16-fiber MPO cable links with specific encoding patterns could be adapted for use with a different type of MPO cable link by connecting a suitable hybrid test cable between the source assembly and the cable link to be tested to test optical signals from the former to the characteristics of the latter (e.g., fiber number, connector type, encoding patterns).

In some implementations, the or each optical source 26 can be embodied by one or more light-emitting diode (LED) or laser (e.g., VCSEL) sources configured to emit the test optical signals 28 at wavelengths ranging, for example, from 400 nm to 1700 nm, and more preferably greater than about 600 nm (to avoid undesirably high insertion loss due to propagation along the multi-fiber link under test) and lower than about 950 nm (to allow detection using conventional silicon CMOS image sensor technology). The type and number of each optical source 26 can be dictated by several factors depending on the application in which the test system 20 is intended to be used. More particularly, if more than one optical source is provided, the different sources need not all be identical and/or have identical illumination parameters. More details regarding possible internal configuration of the source assembly are presented below.

In some implementations, the source assembly 22 can be configured to generate the test optical signals 28 with mutually distinguishable optical characteristics (e.g., spectral range, amplitude modulation, intensity levels or other encoding schemes). For example, the source assembly 22 can include an optical power intensity level encoder or an optical wavelength encoder to produce, respectively, an intensity level injection pattern or a spectral injection pattern. In such implementation, different test optical signals 28 with different encoded properties can be injected in different optical fiber links 102 of the cable link under test 100, thereby facilitating polarity testing, and optionally continuity testing, as described in more detail below. Depending on the application, encoding of the test optical signals can be achieved by various methods including, but not limited to, active electronic control, passive optical selection or filtering, or a combination thereof.

In some scenarios, it may be required or suitable to test the individual connection arrangement of each optical fiber link 102 of the multi-fiber cable link 100 in order to provide a complete input-to-output mapping of the optical fiber link 102 between the source MFC 104 and the probe MFC 106, irrespective of standard-defined cable Types. Accordingly, in some implementations, the source assembly 22 may comprise a distinct optical source 26 for each individual optical fiber link 102 of the multi-fiber cable link 100. In such implementations, the complete input-to-output mapping of the optical fiber link 102 can be determined by individually activating each optical source 26, e.g., in accordance with a defined sequence, and identifying a position of the corresponding light spot in a connector surface image.

In some implementations, the source assembly 22 may optionally include a source controller 64 to activate and inactivate the optical sources 26 as a function of commands received by the source assembly 22 and/or as a function of a defined time sequence.

In the embodiment of FIG. 4, the source assembly 22 is connected to the cable link under test 100 via a suitable launch cable link 32 (e.g., a 1×12 MPO cable link in FIG. 4). In the illustrated embodiment, the launch cable link 32 is connected at one end to the source assembly 22 and at the other end to the cable link under test 100 using a suitable MFC adapter 34. It should be noted that, in general, the polarity of the launch cable link 32 (e.g., Type A, Type B or Type C), the MFC adapter 34 (e.g., Type A: key-up/key-down; or Type B: key-up/key-up) and any other fiber coupling hardware provided between the optical source(s) 26 and the cable link under test 100 should be predetermined, previously characterized or otherwise known prior to testing the polarity of the cable link under test 100.

Referring still to FIG. 4, the fiber inspection probe 24 is optically coupled at the probe end 112 of the cable link under test 100, opposite to the source end 110 to which is connected the source assembly 22. Broadly stated, the fiber inspection probe 24 is configured to collect and detect the test optical signals 28 generated by the source assembly 22 after propagation in the cable link 100.

In the present description, the term "fiber inspection probe", is intended to refer to an image capture device configured to be coupled an MFC at one end of a cable link under test to acquire connector surface images of the end surface thereof from which information about the presence, location and/or optical characteristics of test optical signals injected at the other end of the cable link by a source assembly and exiting through one or more exit ports on the MFC can be accessed, retrieved, derived or otherwise obtained. In other words, the fiber inspection probe acts as a connector surface imager. Depending on its field of view, each connector surface image acquired by the fiber inspection probe can encompass the optical fiber endface of one, some or all of the optical fiber links of the cable link under test. The fiber inspection probe can be embodied by one of various conventional devices used in existing connector inspection systems, that is, devices primarily designed, dedicated and intended for use in evaluating the cleanliness and quality of optical fiber endfaces of MFCs. Such devices can include and be associated with an image processor provided with suitable algorithms for processing, analyzing and/or displaying such connector surface images and evaluate therefrom the condition, cleanliness, quality or other aspects of connectors.

Some implementations of the present techniques can therefore expand the functionality of conventional fiber inspection probes and microscopes by using these devices not only for their primarily intended purpose of connector inspection, but also for other types of optical fiber testing, including one or more among polarity, continuity and/or optical loss tests, as described below. In such implementations, broadening the functionality of conventional fiber inspection probes can advantageously save time and cost in testing multi-fiber cable links.

It should be noted, however, that in other implementations, the fiber inspection probe need not be an image capture device whose primary intended function is to inspect connectors for cleanliness and quality. In such implementations, a fiber inspection probe could be designed specifically for polarity testing—and optionally continuity and/or optical loss testing—based on the principles and techniques described herein, without also being used for inspection of MFCs for cleanliness and quality.

In some implementations, the fiber inspection probe can be a portable instrument, which is both compact and light enough to be readily held in, moved and operated by one or both hands of a user, thereby facilitating the implementation of the multi-fiber cable testing methods described herein in optical networks, including in high-density patch panels. However, it should be noted that some implementations of the present techniques may employ a fixed—as opposed to portable—fiber inspection probe, without departing from the scope of the present description.

Returning to the embodiment of FIG. 4, the fiber inspection probe 24 can include a portable housing 36, an imaging system 38 and an optional illumination source 40 accommodated in the portable housing 36, and a probe tip 42 configured to be coupled to the second MFC 106 to provide an optical path between the cable link under test 100 and the imaging system 38. The portable housing 36 may have an ergonomic shape to facilitate grasping and holding of the fiber inspection probe 24 by a user while in use. For example, in one embodiment, the fiber inspection probe can be embodied by EXFO's FIP-400B series of Fiber Inspection Probes.

The imaging system 38 can include imaging optics 44 and an image sensor 46. The imaging optics 44 is configured to direct light from the endface of the probe MFC 106 and onto the image sensor 46. In the present techniques, the directed light can include test optical signals 28 generated by the source assembly 22 and having propagated through the cable link under test 100, from the source MFC 104 to and out of the probe MFC 106. The imaging optics 44 can include lenses, mirrors, filters and other reflective, refractive and/or diffractive optical components. In some implementation, the imaging optics 44 may include focusing optics which may optionally be controlled to perform autofocus on the captured image(s).

In implementations where the fiber inspection probe is also used for evaluating the cleanliness and quality of MFCs, the imaging system 38 can further be configured to direct onto the image sensor 46, illumination light returned by the surface of the probe MFC 106 in order to produce connector surface images to be processed for connector cleanliness and quality inspection (referred to herein as inspection images).

The image sensor 46 can include a sensor array made up of a plurality of photosensors, or pixels, configured to detect the collected light incident thereonto and generate therefrom an image of at least part of the probe MFC surface. Depending on the application, the image sensor 46 can be embodied by a charge-coupled device (CCD) sensor, a complementary metal-oxide-semiconductor (CMOS) sensor or another type of image sensor capable of acquiring a pixel-based image of an MFC surface. The image sensor 46 has a spectral bandwidth that should encompass the spectral band containing the test optical signals generated by the source assembly 22.

Depending on the application, the image sensor 46 may or may not include a color-separation mechanism to produce color images. For example, in implementations employing a spectral injection pattern, color images may be used to identify the spectral pattern of at the probe MFC 106, whereas in implementations employing an intensity level injection pattern, color images are unnecessary, and an intensity-only image sensor may advantageously provide a better image resolution for the same or a lower cost compared to a color image sensor.

The image sensor 46 can have a resolution sufficient to identify individual fiber endfaces—and detect test optical signals 28 emanating therefrom—in at least a portion of the array of fiber endfaces of the probe MFC 106, without the probe 24 necessarily having a sufficiently large field of view to image the entire probe MFC endface in single exposure. In such a case, the fiber inspection probe 24 can be provided with a shifting mechanism operable to shift its field of view to cover the entire probe MFC endface in a plurality of images. For example, in one possible embodiment, a 1×12 probe MFC endface could be covered by three distinct image acquisition steps, each step covering three groups of four fiber endfaces. Non-limiting examples of fiber inspection probes with movable fields of view are disclosed in co-assigned U.S. Pat. Appl. Pub. Nos. 2015/0092043 A1 and 2017/0003195 A1, the contents of both applications being incorporated herein by reference in their entirety. The image sensor 46 may be configured to operate in either an image capture mode to capture still images at its full resolution, or a video mode to produce a video stream in lower resolution, e.g. using such methods as pixel skipping or binning. The image sensor 46 may support either one or both modes. Depending on the application, the image sensor 46 can capture and output MFC surface images either as still images or as a video stream.

In some implementations, the illumination source 40 is configured to project illumination light onto the area of the probe MFC connector viewed by the fiber inspection probe 24, such that illumination light returned by the surface of the probe MFC connector produces an image onto the image sensor 46 which can be used for connector inspection. For example, the illumination source 40 can be embodied by a LED source. As described below, in the present techniques, the illumination source 40 can also or alternatively be used to allow the fiber inspection probe 24 to communicate with the source assembly 22 by optical signal transmission through the cable link under test 100. In such implementations, the source assembly 22 can include a source receiver 48 for receiving, through the cable link under test 100, commands or other optically encoded information from the illumination source 40 of the fiber inspection probe 24. For example, the source receiver 48 can be a photodetector or any other device capable of detecting optical signals. In some implementations, the illumination source 40 of the probe 24 can be turned off during fiber testing to facilitate detection of the presence and location of light spots produced by test optical signals in the image captured by the image sensor 46.

In some implementations, the probe tip 42 may be releasably or integrally connected to the housing 36 of the fiber inspection probe 24. In the former case, the fiber inspection probe 24 could be provided with a set of interchangeable probe tips designed for common MFCs available on the market, each probe tip allowing testing of a specific type of multi-fiber cable link.

In operation of the test system 20, the source assembly 22 injects, through the source MFC 104, test optical signals 28 into and for propagation along corresponding optical fiber links 102 of the cable link under test 100. The test optical signals 28 can be launched into the fiber links 102 either simultaneously or sequentially. In some implementations, the test optical signals 28 can be generated with distinct optical characteristics, for example in terms of spectral content or power intensity level, to produce mutually distinguishable responses for detection by the fiber inspection probe 24.

The test optical signals 28 come out of the optical fiber links 102 through the probe MFC 106. The fiber inspection probe 24, which is connected to the cable link under test 100 at the probe end 112 thereof, is configured to collect and detect the test optical signals 28 and to generate therefrom an image of the probe MFC surface. The connector surface image thus acquired contains information about the polarity of the cable link under test 100, which can be identified, extracted or otherwise obtained. This is because depending on the polarity of the cable link under test 100, the test optical signals 28 will be outputted from different exit ports of the probe MFC 106, which can be seen in the connector surface image captured by the fiber inspection probe 24. Indeed, each one of the detected test optical signals 28 can be imaged as a light spot, or another recognizable feature or indication, in the image of the probe MFC endface. From a mapping between pixel coordinates in the connector surface image and corresponding physical locations on the surface of the probe MFC 106, the spatial location in the connector surface image of a light spot or light spots corresponding to the test optical signals 28 can be used to determine the output fiber port(s) (e.g., one or more of $P_1$ to $P_{12}$) from which this test optical signal 28 originated. Then, because the injection pattern defining the input fiber port(s) (e.g., one or more of $P_1$ to $P_{12}$) into which the test optical signal(s) 28 were launched is known, the input-to-output mapping of the test optical signal(s) 28 can be determined and compared against known mappings (see, e.g., Table I above) to determine the polarity of the cable link under test 100.

The image sensor 46 of the fiber inspection probe 24 may include or be in communication with an image processor 50 programmed with instructions for analyzing the connector surface images captured by the image sensor 46 in view of identifying the polarity and/or checking the continuity of the cable link under test 100. The analysis performed by the image processor 50 can involve, for example, identifying the presence, location and/or optical characteristics of light spots or similar features in connector surface images of the probe MFC 106, which light spots correspond to test optical signals generated by the source assembly 22 and detected by the fiber inspection probe 24 after propagation through fiber links 102 of the cable link under test 100. The image processor 50 may be embodied by a computer, a microprocessor, a microcontroller, a central processing unit (CPU), or the like; be implemented in hardware, software, firmware, or any combination thereof. The connector surface images captured by the fiber inspection probe 24 can be transmitted to an image processor 50 via wired and/or wireless transmission links. Depending on the application, the image processor 50 may be integrated, partially integrated or physically separate from the fiber inspection probe 24.

In FIG. 4, the test system 20 can include a display unit 52 connected to, and capable of displaying connector surface images acquired by, the fiber inspection probe 24. In the scenario shown in FIG. 4, the source assembly 22 simultaneously injects test optical signals 28 into the optical fiber links 102 connected to fiber ports $P_1$, $P_4$, $P_7$ and $P_{10}$ of the source MFC 104. The resulting connector surface image 54 acquired by the fiber inspection probe 24 and displayed by the display unit 52 includes light spots at locations corresponding to the fiber ports $P_3$, $P_6$, $P_9$ and $P_{12}$ of the probe MFC 106. By consulting Table I, it would therefore be concluded that the cable link under test 100 in FIG. 4 has a polarity of Type B. In the illustrated embodiment, the display unit 52 is embodied by a standalone display device designed and intended to be used with the fiber inspection probe 24, in which case the image processor 50 may be provided inside the display unit 52. However, in other implementations, the display unit 52 can be integrated into the fiber inspection probe 24 or be provided on a non-dedicated device such as a personal computer or another external viewing device.

It is to be noted that, in some implementations, the polarity of the cable link under test 100 could, in principle, be determined or verified unambiguously using only one test optical signal, given the limited number of different polarity types generally used in practice in multi-fiber cable links. That is, looking at Table I, if a single test optical signal were to be injected into, say, port $P_5$ of the source MFC 104, then one would expect to observe a light spot in the connector surface image of the probe MFC 106 captured by the fiber inspection probe 24 at a location corresponding to one of ports $P_5$ (Type A), $P_8$ (Type B), $P_6$ (Type C) and $P_7$ (Type D), but not to one of the remaining ports $P_1$ to $P_4$ and $P_9$ to $P_{12}$. If the test optical signal is ultimately found to have exited the cable link under test 100 from, say, port $P_6$ of the probe MFC 106, then one would conclude that the polarity of the cable link under test 100 is of Type C. However, using more test optical signals than might be necessary may be useful in some implementations to provide redundancy and increase the confidence in the polarity testing.

In some implementations, the present techniques can also be used to test the continuity of the cable link under test 100, which involves checking that every one of its fiber link 102 allows end-to-end propagation therethrough. Therefore, and unlike polarity testing, continuity testing of the cable link 100 in FIG. 4 would generally involve simultaneously or sequentially sending a test optical signal 28 into each fiber link 102 at the source end 110 and checking it has reached the probe end 112 by assessing its presence as a light spot or another presence parameter in a connector surface image acquired by the fiber inspection probe 24.

In other implementations, the present techniques can also be used for estimating insertion losses along the cable link under test 100. The loss estimation test can involve two steps. First, a reference step is performed by identifying test optical signals in a first connector surface image acquired by the fiber inspection probe 24 as described above, but without the cable link to be tested. Performing the reference step with the test system 20 of FIG. 4 could involve connecting the fiber inspection probe 24 to the launch cable link 32 at the end opposite the source assembly 22; acquiring a connector surface image thereof while test optical signals are injected therein; and identifying light spots or features in the image corresponding to the test optical signals detected by the probe 24. The second step would involve repeating the reference step, that is, with the same combination of test optical signals, but with the cable link to be tested 100 inserted between the source assembly 22 and the probe 24. This step provides a second connector surface image, in which light spots or features corresponding to the test optical signals detected by the probe 24 can also be identified. Then, comparison of the first and second connector surface images can provide relevant information about the optical losses caused by the presence of the cable link 100, even though the spectral range in which the test is performed—which should fall in the imaging bandwidth of the probe 24—may differ from the spectral transmission band in which the cable link under test 100 is designed to operate. In some implementations, the comparison of the first and second connector surface images can involve comparing the corresponding light spots in the two images (e.g., in terms of integrated light spot power). In addition to providing a manner to estimate insertion losses in the cable link under test, the reference step can provide a way to calibrate the test system and improve the robustness of the signal detection for polarity or continuity testing.

The test system 20 of FIG. 4 can also include a controller 56 configured to control and execute, at least partially, functions required to operate or communicate with the various components of the test system 20 including, without being limited to, the source assembly 22, the fiber inspection probe 24, the image processor 50 and the display unit 52. The controller 56 is typically implemented in a software including computer-readable instructions that are to be executed by a processor, which can be a computer, a microprocessor, a microcontroller, a CPU, a field-programmable gate array (FPGA), or the like. Non-limiting examples of functions that may be performed by the controller 56 can include one or more of the following: controlling the operation of the image sensor 46 to trigger image capture and transfer, controlling the operation of imaging optics 44 to perform autofocus, controlling the operation of the source assembly 22, directly or indirectly (in the latter case, for example via the fiber inspection probe 24); controlling the operation of the fiber inspection probe, directly or indirectly (in the latter case, for example via the source assembly 22); and communicating with the image processor 50, for example to provide information about the test optical signals 28 injected into the cable link under test 20 (e.g., the fiber port of the source MFC 104 into which each test optical signal is injected or the encoding pattern imparted to each test optical signal). Depending on the application, the controller 56 may be integrated, partially integrated or physically separate from the optical hardware components including the source assembly 22, the fiber inspection probe 24, the display unit 52, or another separate, dedicated or non-dedicated, component. For example, in FIG. 4, the controller 56 is integrated into the fiber inspection probe 24.

Figure 5A:
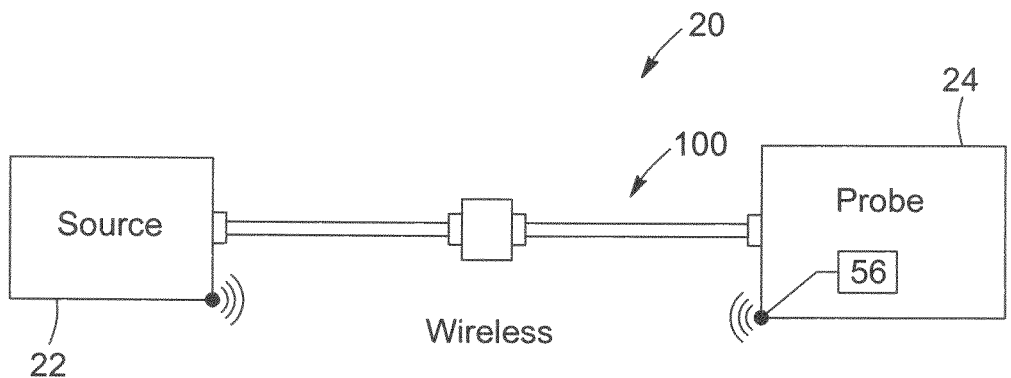
Figure 5B:
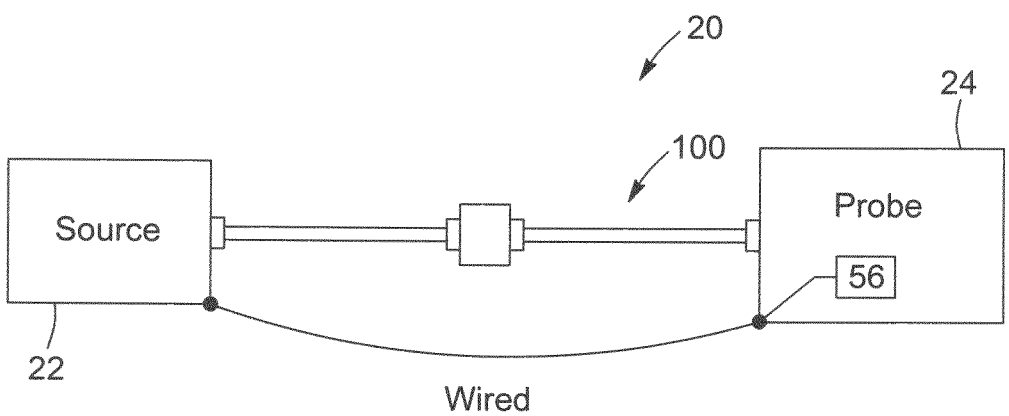
Figure 5C:
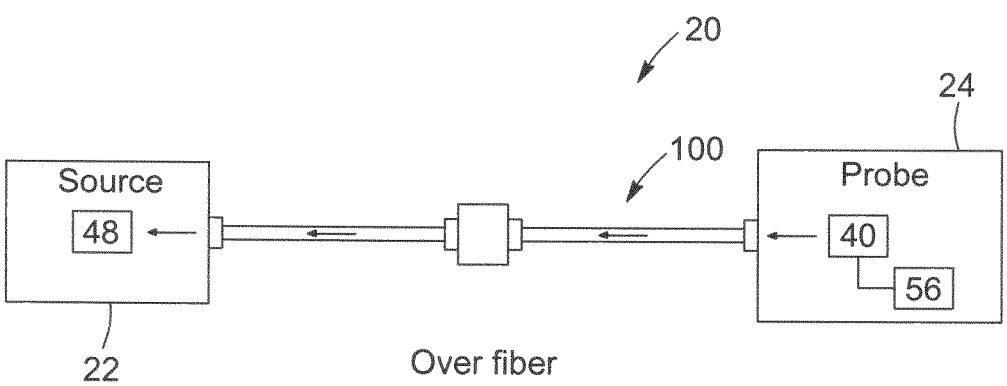

Referring now to FIGS. 5A to 5C, in some implementations, the controller 56 can be used for controlling and timing the execution of the connector inspection step (where the source assembly 22 is generally inactive) and the execution of the polarity/continuity testing step (where the source assembly 22 is generally active), to avoid any undesirable or inadvertent interference therebetween and enhance the efficiency of the overall fiber testing procedure. FIGS. 5A to 5C are schematic representations of three possible communication methods the fiber inspection probe 24 and the source assembly 22, in scenarios where the controller 56 is integrated in the probe 24: wired transmission (FIG. 5A); wireless transmission (FIG. 5B); and over-fiber transmission via the cable link under test 100 (FIG. 5C). Of course, the controller 56 could instead be provided in the source assembly 22 or another separate device in other implementations.

In the scenario of FIG. 5C, the source assembly 22 can include a source receiver 48 for receiving, as modulated optical signals generated by the illumination source 40 of the fiber inspection probe 24—or another separate source—and transmitted along the cable link under test 100, commands issued by the controller 56. Non-limiting examples of such commands can include commands for turning the source assembly 22 on or off, and commands for triggering the generation of test optical signals by the source assembly 22, including, but limited to, the number and order of test optical signals to be generated, the optical characteristics that should be imparted thereto, and/or the fiber links into which they are injected. In some implementations, the sensitivity of the source receiver 48 can be enhanced by turning off the optical source(s) of the source assembly 22 between emission periods. It should be noted that when the fiber inspection probe 24 is a conventional probe designed and intended for use in assessing the condition of MFC endfaces, one or more features could be added to the probe to enhance communication with the source assembly 22 and, therefore, fiber testing. Non-limiting examples of such features include another light source and another reflector or lens to improve power injection through the MFC on the probe side.

In some applications, however, it may not be possible, straightforward or desirable to provide a communication link between the source assembly and the fiber inspection probe to control the former by the latter. In one embodiment, a testing configuration involving two operators communicating with each other can be used, in which one operator controls the source assembly and the other controls the fiber inspection probe. In another embodiment, the source assembly can be configured to emit light according to a predetermined time-dependent emission sequence including active periods during which the source assembly emits test optical signals of polarity/continuity/loss testing, alternating with inactive periods during which the source assembly does not emit test optical signals. In such implementations, the fiber inspection probe can detect the presence of test light from the source through the multi-fiber cable link and synchronize its operation based thereon. More particularly, the fiber inspection probe can be configured for polarity testing during the active periods and for connector inspection during the inactive periods.

Figure 6:
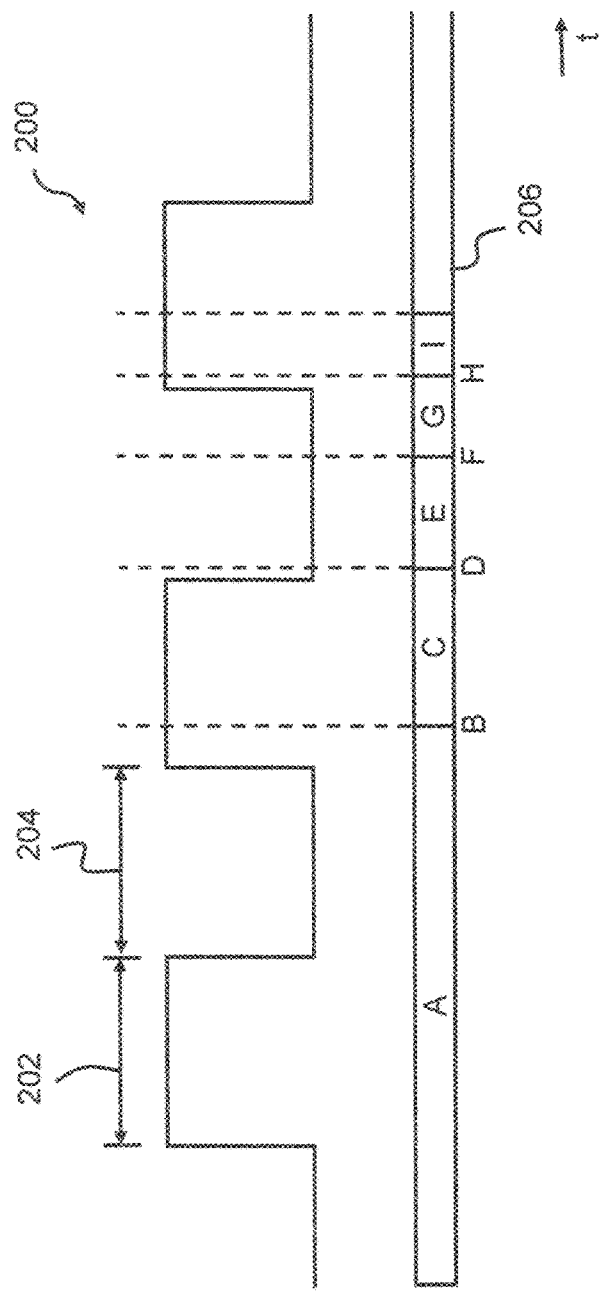
FIG. 6 is a schematic representation illustrating the sequence and timing of steps of a method for characterizing a multi-fiber cable link in accordance with one embodiment in which the fiber inspection probe synchronizes image acquisition steps with the emission pattern of the source assembly.

Referring to FIG. 6, an exemplary embodiment of a test method is described, in which the fiber inspection probe of FIG. 4 synchronizes its image acquisition steps with a cyclic emission sequence 200 of the source assembly 22 defining active periods 202 during which test light is active, alternating with inactive periods 204 during which said test light is inactive. Steps of the test method of FIG. 6 are performed in accordance with a test sequence 206 timed with the detection of the emission sequence 200 of the source assembly such that polarity testing is executed during an active period 202 and connector inspection is executed during an inactive period 204. The test sequence 206 can be timed relative to the emission sequence 200 by identifying active and inactive periods from captured connector surface images. This embodiment is particularly advantageous for performing both polarity/continuity testing and connector cleanliness and quality inspection, while obviating the need for a communication mean between the source assembly 22 and the fiber inspection probe 24. As explained hereinabove, in some implementations, this embodiment may also optionally integrate insertion loss estimation.

In accordance with this embodiment, the source assembly 22 is configured to emit test light in accordance with both a defined injection pattern and a defined and cyclic emission sequence 200 comprising active periods 202 alternating with inactive periods 204. As explained herein above, the injection pattern may involve an intensity level encoding, a spectral encoding or a combination thereof. Test optical signals may also be injected simultaneously or sequentially into corresponding optical fiber links. In any case, the emission sequence 200 will include inactive periods 204 during which no test light exits the probe MFC 106 within the field of view of the fiber inspection probe. The duration of the active periods 202 and that of the inactive periods 204 may or may not be equal and can depend on the application, the image sensor speed and resolution, the data transfer speed and the image processor speed. In one exemplary implementation, the specified time for the capturing one full-resolution image is 0.5 second, and active and inactive periods each last 1 second. In another exemplary implementation, the active period lasts 1 second and the inactive period lasts 0.5 second.

Once the source assembly 22 is coupled to the source MFC 104 and the probe MFC 106 is coupled to the fiber inspection probe 24, a test sequence can be launched, e.g., by manual activation of a press button on the fiber inspection probe 24 or automatically, upon detection of test signals or other features on captured images. The test sequence of the method of FIG. 6 comprises step A of adjusting the focus; optional step B of turning off the illumination source 40; step C of monitoring test light in the captured video stream; step D of detecting an inactive period 204 and optionally turning on the illumination source 40; step E of capturing a first connector surface image to be processed for connector cleanliness and quality inspection (referred to herein as an inspection image); optional step F of turning off the illumination source; step G of monitoring test light in the captured video stream; step H of detecting an active period 202; and step I of capturing a second connector surface image to be processed for polarity detection (referred to herein as a polarity-testing image).

The timing and execution of the test sequence, including the timing of the execution of the connector cleanliness and quality inspection and that of the polarity/continuity testing, can be controlled by the controller 56. In the context of timing and execution of the test sequence, non-limiting examples of commands provided by the controller 56 include: commands for setting the image sensor 46 in video mode, commands for triggering an image capture, commands for activating and deactivating the illumination source 40, commands for initiating a variety of image analysis algorithms performed by the image processor 50, and commands for controlling focusing optics to adjust the focus on captured images. The controller 56 can be in communication with the image processor 50 to receive image analysis results and launch the execution of the next step based on such results.

In some implementations, the illumination source 40 may be kept active during acquisition of both inspection images and polarity-testing images. In some other implementations and in order to maximize the contrast of light spots on the polarity testing images and thereby improve reliability of light spot detection and assessment, the controller can optionally control the activation of the illumination source 40 to turn off the illumination source 40 for capturing polarity testing images and turn it turn on for capturing inspection images.

Before capturing connector surface images with the image sensor 46, the focus of the imaging system 38 may need to be adjusted. The test sequence may include a step A of adjusting the focus using an autofocus algorithm. The fiber inspection probe 24 can perform the autofocus algorithm using images of a video stream generated by the image sensor 46 in a video mode. In order to obtain clean inspection images of the connector surface for inspection, focusing is adjusted while the illumination source is active. That being said, in some applications, the autofocus algorithm can be executed based on video images captured during both inactive periods 204 and active periods 202, which images include light spots resulting from test light. Such light spots will not interfere with the autofocus algorithm provided their intensity is maintained lower than an acceptable level. The autofocus process can thus overlap multiple active and inactive periods. In other applications, the autofocus process can be adapted to detect light spots in images of the video stream and interrupt the autofocus algorithm over active periods 202.

In step B, once focus is adjusted, the illumination source 40 may optionally be turned off for monitoring light spots resulting from test light in endface images.

In step C, images from video stream are monitored to detect the next inactive period 204 during which light spots from test light are absent from the images. The image processor 50 may identify active and inactive periods based on the detection of light spots in the images. In some implementations where the illumination source 40 is inactive during step C, an inactive period can be identified by evaluating a total intensity of light as integrated over the surface of the image sensor 40 or over sub-regions thereof and detecting variations in such intensity or comparing such intensity to a given threshold. In some other implementations, an inactive period may be identified when the intensity level is below a given threshold on all pixels.

In step D, an inactive period is detected, which may optionally trigger an activation of the illumination source 40 and triggers step E of capturing a first connector surface image of the probe MFC 106 (referred to herein as an inspection image) in an image capture mode of the image sensor 46.

The inspection image can be analyzed by the image processor 50 to determine the positions of one or more optical fiber endfaces and evaluate the cleanliness and quality thereof.

In step F, once step E is completed, the illumination source 40 may again optionally be turned off.

In step G, images from video stream are monitored to detect the next active period 202 during which light spots from test light are present in the images. As in step C, in some implementations, an active period can be identified by evaluating a total intensity of light as integrated over the surface of the image sensor 40 or over sub-regions thereof and detecting variations in such intensity or comparing such intensity to a given threshold.

In step H, an active period is detected, which triggers step I of capturing a second connector surface image (referred to herein as a polarity-testing image) in an image capture mode of the image sensor 46.

The polarity-testing image can be analyzed by the image processor 50 to identify light spots resulting from test light and determine a pattern thereof, from which the polarity of the multi-fiber cable link can be determined. In some implementations, the polarity-testing image can be further analyzed to determine presence of light spots corresponding to respective positions of each identified optical fiber endfaces and determine a continuity of said optical fiber links of the multi-fiber cable link.

In accordance with one exemplary algorithm, determining the presence, intensity level and/or spectral content of light spots involves the image processor 50 initially determining respective positions of one or more optical fiber endfaces in an inspection image and then using the determined positions to estimate an intensity level and/or a spectral content of light associated with each determined positions in a polarity-testing image, for example by integrating pixels in the polarity-testing image, which are located within a circle or region centered or otherwise positioned relative to the x-y coordinates of a corresponding optical fiber endface.

In some implementations, fiber inspection probe 24 may not have a field of view that is large enough to image all the optical fiber endfaces of the probe MFC 106 in single exposure. In such a case, the fiber inspection probe 24 can be provided with a shifting mechanism operable to shift the field of view to capture all the optical fiber endfaces in plurality of images. In such cases, the sequence of steps of the method of FIG. 6 can be repeated for each position of the shifting mechanism.

It will be understood that the test sequence of the method of FIG. 6 is exemplary only and that in other implementations, the various steps and/or the order thereof can be modified. For example, steps F, G, H, I can be swapped with steps B, C, D, E.

Figure 7:
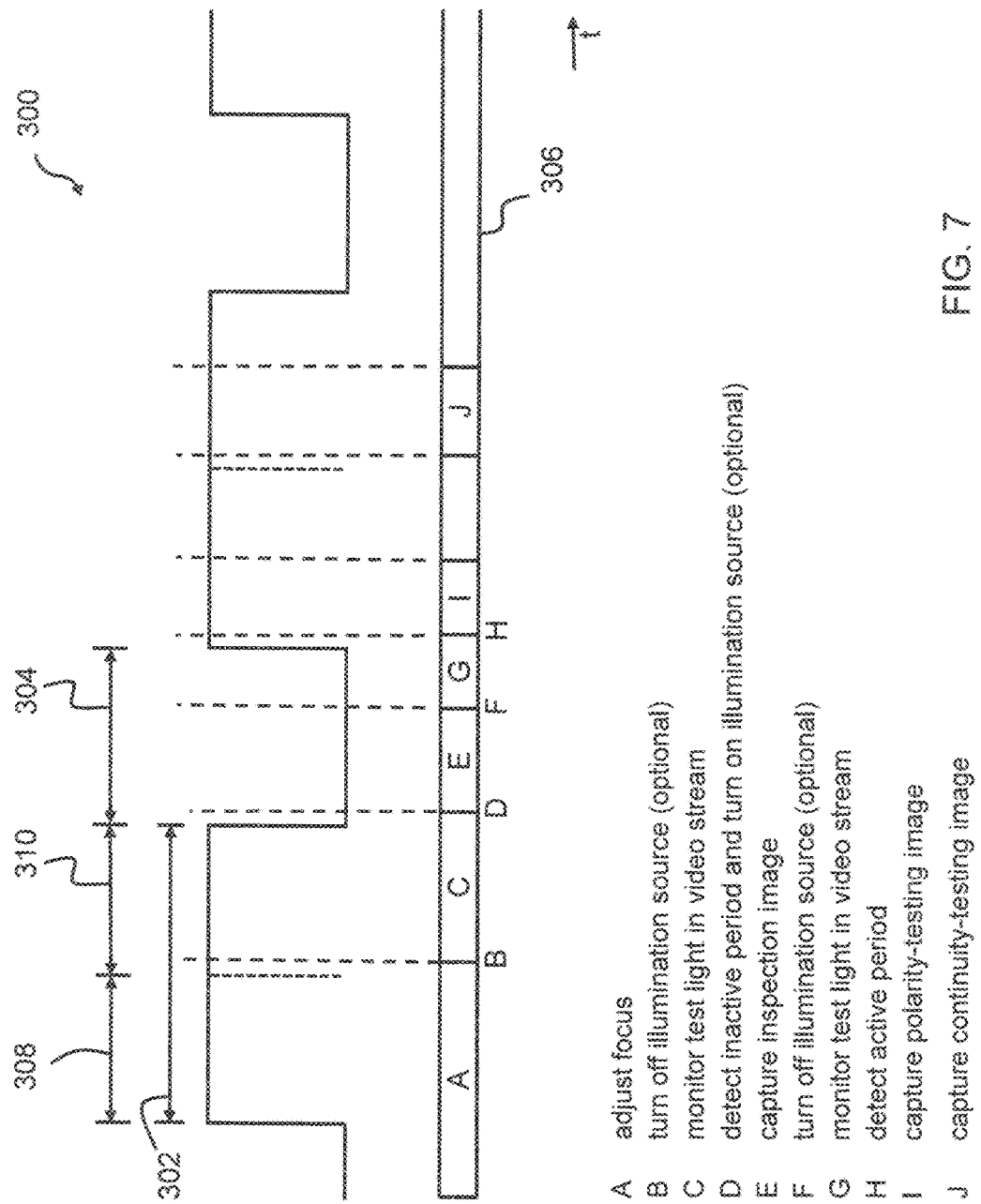
FIG. 7 is a schematic representation illustrating the sequence and timing of steps of a method for characterizing a multi-fiber cable link in accordance with another embodiment in which the fiber inspection probe synchronizes image acquisition steps with the emission pattern of the source assembly.

Referring to FIG. 7, another exemplary embodiment of a test method is described, in which the fiber inspection probe of FIG. 4 synchronizes its image acquisition steps with an emission sequence 300 of the source assembly 22. In the method of FIG. 7 as in that of FIG. 6, active periods 302 during which test light is active alternate with inactive periods 304 during which test light is inactive. The active period 302 is further divided into a polarity-testing period 308 during which test light is injected into a subset of one or more optical fiber links to define an injection pattern; and a continuity-testing period 308 during which test light is injected in all optical fiber links of the source MFC 104 for continuity verification. The method of FIG. 7 includes some steps and features that are similar to those of the method of FIG. 6 and such common steps and features will therefore not be repeatedly described.

Steps of the test method of FIG. 7 are performed in accordance with a test sequence 306 timed with the detection of the emission sequence 300 of the source assembly such that continuity verification is executed during a continuity-testing period 310, polarity detection is executed during a polarity-testing period 308 and connector inspection is executed during an inactive period 304. The test sequence 306 can be timed relative to the emission sequence 300 by identifying active and inactive periods from captured connector surface images. This embodiment is also particularly advantageous for performing both polarity/continuity testing and connector cleanliness and quality inspection, while obviating the need for a communication mean between the source assembly 22 and the fiber inspection probe 24. As explained hereinabove, in some implementations, this embodiment may also optionally integrate insertion loss estimation.

In accordance with this embodiment, the source assembly 22 is configured to emit light in accordance with a continuity-testing mode in which test light is injected in all optical fiber ports of the source MFC 104, a polarity-testing mode in which light in injected in accordance with a defined injection pattern, and an inactive mode in which no test light is injected. The source assembly 22 is further configured to toggle between these modes in a defined and cyclic emission sequence 300 comprising polarity-testing periods 308, continuity-testing periods 310 and inactive periods 304. In this case, the injection pattern involves an intensity level encoding according to which test light is injected simultaneously into only a subset of one or more optical fiber links (e.g. connected to fiber ports $P_1$, $P_4$, $P_7$ and $P_{10}$ of the source MFC 104). The duration of the polarity-testing, continuity-testing and inactive periods may or may not be equal and can depend on the application, the image sensor speed and resolution, the data transfer speed and the image processor speed. In one exemplary implementation, the specified time for the capturing one full-resolution image is 0.5 second, and polarity-testing, continuity-testing and inactive periods each last 1 second.

Once the source assembly 22 is coupled to the source MFC 104 and the probe MFC 106 is coupled to the fiber inspection probe 24, a test sequence can be launched. The test sequence 306 of the method of FIG. 7 comprises step A of adjusting the focus; optional step B of turning off the illumination source 40; step C of monitoring test light in the captured video stream; step D of detecting an inactive period 204 and optionally turning on the illumination source 40; step E of capturing a first connector surface image to be processed for connector cleanliness and quality inspection (referred to herein as an inspection image); optional step F of turning off the illumination source; step G of monitoring test light in the captured video stream; step H of detecting an active period 202; step I of capturing a second connector surface image to be processed for polarity detection (referred to herein as a polarity-testing image); and step J of capturing a third connector surface image to be processed for continuity detection (referred to herein as a continuity-testing image).

The timing and execution of the test sequence 306, including the timing of the execution of the connector cleanliness and quality inspection and that of the polarity testing and continuity testing, can be controlled by the controller 56. In the context of timing and execution of the test sequence 306, non-limiting examples of commands provided by the controller 56 include: commands for setting the image sensor 46 in video mode, commands for triggering an image capture, commands for activating and deactivating the illumination source 40, commands for initiating a variety of image analysis algorithms performed by the image processor 50, and commands for controlling focusing optics to adjust the focus on captured images. The controller 56 can be in communication with the image processor 50 to receive image analysis results and launch the execution of the next step based on such results.

In some implementations, the illumination source 40 may be kept active during acquisition of inspection images, continuity-testing images and polarity-testing images. In some other implementations and in order to maximize the contrast of light spots on the polarity and continuity testing images and thereby improve reliability of light spot detection and assessment, the controller can optionally control the activation of the illumination source 40 to turn off the illumination source 40 for capturing polarity-testing and continuity-testing images and turn it turn on for capturing inspection images.

Steps A, B, C, D, E, F, G, H, I of the test sequence 306 are similar to that or test sequence 206 of FIG. 6 and will therefore not be repeatedly described.

In step J, a third connector surface image (referred to herein as a continuity-testing image) is captured in an image capture mode of the image sensor 46. In some implementations, step J can be triggered by the detection of a continuity-testing period involve an evaluation of a total intensity of light as integrated over the surface of the image sensor 40 or over sub-regions thereof and detection of variations in such intensity, which is expected to be greater during continuity-testing periods than during polarity-testing periods. In some other implementations, step I can be triggered following a given time lapse after step H.

The inspection image can be analyzed by the image processor 50 to determine the positions of one or more optical fiber endfaces and evaluate the cleanliness and quality thereof.

The polarity-testing image can be analyzed by the image processor 50 to identify light spots resulting from test light and determine a pattern thereof, from which the polarity of the multi-fiber cable link can be determined.

The continuity-testing image can be analyzed to determine presence of light spots corresponding to respective positions of each identified optical fiber endfaces and determine therefrom a continuity of said optical fiber links of the multi-fiber cable link.

It will be understood that the test sequence of the method of FIG. 7 is exemplary only and that in other implementations, the various steps and/or the order thereof can be modified. For example, steps F, G, H, I can be swapped with steps B, C, D, E and/or step I swapped with step J.

Figure 8A:
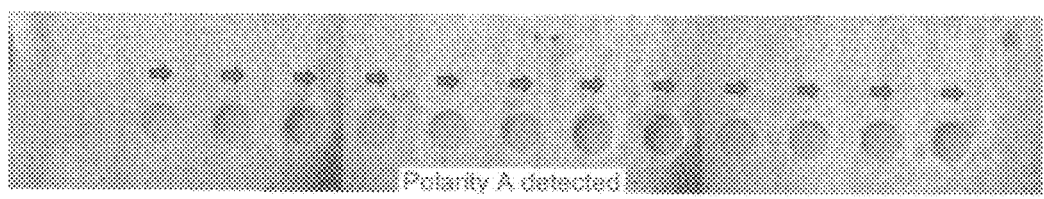
Figure 8B:
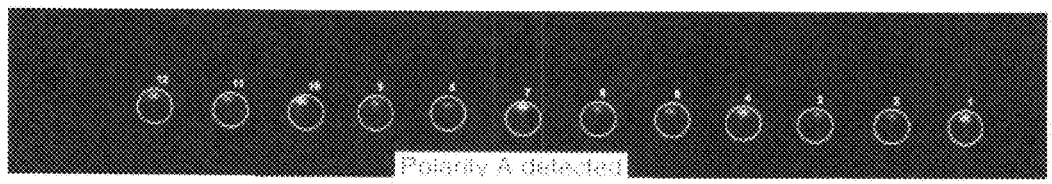

FIG. 8A and FIG. 8B are exemplary images obtained by the method of FIG. 6 and which illustrates the detection of a polarity of Type A. FIG. 8A represents a concatenation of three inspection images, whereas FIG. 8B represents a concatenation of three polarity-testing images, in accordance with an implementation where the field of view of the fiber inspection probe 24 is not large enough to capture all the endfaces of the probe MFC 106 in a single image. It illustrates an implementation whereas the method of FIG. 6 is repeated for three different positions of a shifting mechanism operable to shift the field of view of the fiber inspection probe 24.

Figure 9:
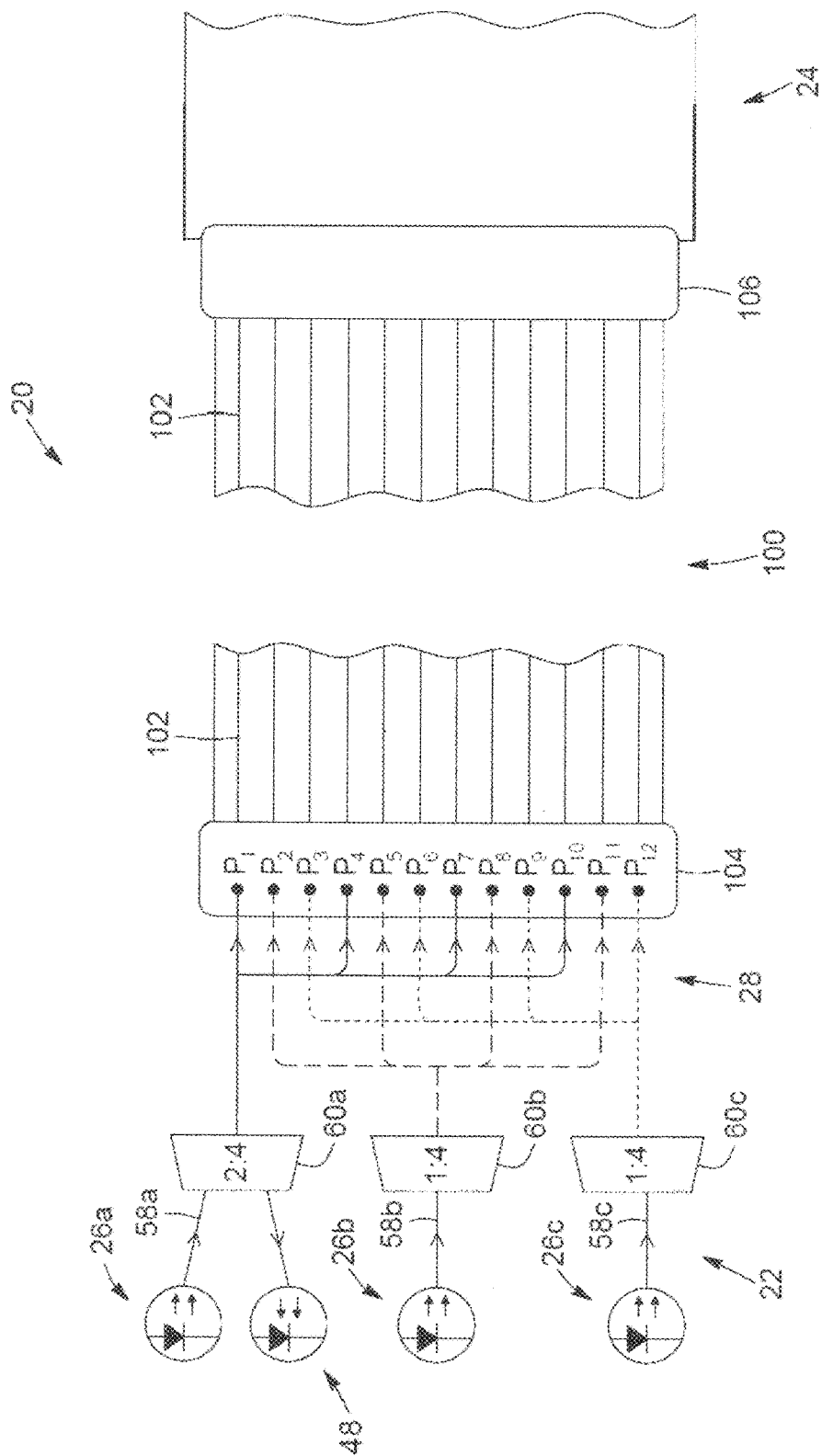
FIG. 9 is a schematic representation of the internal configuration of a possible implementation of a source assembly.

Referring now to FIG. 9, there is shown an exemplary implementation of a source assembly 22, illustrating in more detail its internal configuration. The source assembly 22 could be used in the test system 20 of FIG. 4 to implement the fiber testing techniques described herein, or in another test system. In FIG. 9, the source assembly 22 includes three optical sources 26a, 26b, 26c. Each optical source 26a, 26b, 26c is configured to emit a source signal 58a, 58b, 58c to be delivered to a respective optical coupler 60a, 60b, 60c, each of which being configured to split the source signal 58a, 58b, 58c supplied to it into four test optical signals 28, for a total of twelve test optical signals 28. Each test optical signal 28 outputted by one of the optical couplers 60a, 60b, 60c is injected into a specific one of the twelve fiber port $P_1$ to $P_{12}$ of an MFC 104 of a 1×12 multi-fiber cable link under test 100, such as that shown in FIG. 4. Each one of the fiber ports $P_1$ to $P_{12}$ is connected to a corresponding optical fiber link of the 1×12 multi-fiber cable link 100. The source assembly 22 optionally also includes a source receiver 48 connected to the first optical coupler 60a and configured to receive, through the cable link under test 100, commands or other information from the fiber inspection probe 24 coupled at the opposite MFC 106 of the cable link 100. In some implementations, the source assembly 22 can include a source controller (not shown) to activate and inactivate the optical sources 26a, 26b, 26c either simultaneously or independently. Activation and deactivation can generate different operating modes, including, e.g., a polarity-testing mode, a continuity-testing mode and an inactive mode. Activation/deactivation can be controlled as a function of commands received by the source receiver 22 and/or as a function of a defined time sequence. The source configuration can create test optical signals that enable polarity detection and continuity verification.

In the embodiment of FIG. 9, polarity testing can be achieved by encoding the test light according to a defined intensity level injection pattern, which can be provided by launching test optical signals in a limited number of fiber ports of the source MFC 104. For example, in FIG. 9, the test optical signals 28 originating from the first optical source 26a are injected into ports $P_1$, $P_4$, $P_7$ and $P_{10}$ of the source MFC 104 and used to determine the polarity of the cable link under test 100. This determination is made based on the predefined intensity level injection port pattern (e.g., $P_1$, $P_4$, $P_7$ and $P_{10}$) and by analyzing one or more polarity-testing images acquired by the fiber inspection probe 24 to identify a pattern of light spots corresponding to exit ports from which the four test optical signals came out: ($P_1$, $P_4$, $P_7$, $P_{10}$) for Type A polarity; ($P_{12}$, $P_9$, $P_6$, $P_3$) for Type B polarity; ($P_2$, $P_3$, $P_8$, $P_9$) for Type C polarity; and ($P_{11}$, $P_{10}$, $P_5$, $P_4$) for Type D polarity (see Table I above). Such injection pattern can be suitable, e.g. for implementing a polarity-testing mode in accordance with the test sequence 206 of FIG. 7.

For continuity testing, the presence of test optical signals 28 is verified on every one of the fiber links 102 of the cable link under test 100. In FIG. 9, the twelve optical signals 28 required for this purpose could be injected into the corresponding fiber links 102 either simultaneously or sequentially. In some implementations, the source assembly 22 can be configured to operate in a sequential mode according to which optical sources 26a, 26b and 26c are activated sequentially or in groups. Such implementation allows both polarity and continuity testing.

In some scenarios, e.g., for implementing a continuity-testing mode in accordance with the test sequence 206 of FIG. 7, all twelve test optical signals 28 can be injected simultaneously to test the continuity of the cable link 100 of FIG. 9. As such, test optical signals 28 originating from optical sources 26a, 26b, 26c can be injected simultaneously into all ports.

In some implementations, activation and deactivation of the optical sources 26a, 26b, 26c can be controlled by the source controller in accordance with a defined and cyclic time sequence in order to generate, e.g., the emission sequence of FIG. 7 (only optical source 26a being activated in the polarity-testing mode, all optical sources being activated in the continuity-testing mode and all being deactivated in the inactive mode).

In some scenarios, e.g., for implementing the test sequence 206 of FIG. 6, all twelve test optical signals 28 can be injected simultaneously to test both the polarity and the continuity of the cable link 100 of FIG. 9. In this case, it may be advantageous (e.g., to simplify and/or shorten the testing procedure) that the test optical signals 28 define an intensity level injection pattern according to which, the intensity level of the test optical signals 28 varies from one port to another. The intensity level injection pattern being predefined by the configuration of the source assembly 22, the polarity of the multi-fiber cable link can be determined by comparing the intensity level pattern of light spots detected on the image sensor to expected patterns corresponding to a set of potential polarity types. As such, the power level of the test optical signals 28 originating from the first optical source 26a and injected into ports $P_1$, $P_4$, $P_7$ and $P_{10}$ in FIG. 9) can be made markedly (e.g. 3 dB or another other detectable difference) higher or lower than the power levels of the other test optical signals 28, to facilitate the discrimination of their associated light spots in the connector surface images acquired by the fiber inspection probe 24.

In some implementations, activation and deactivation of optical sources 26a, 26b, 26c can be controlled by the source controller in accordance with a defined and cyclic time sequence in order to generate, e.g., the emission sequence of FIG. 6 (all optical sources being activated during active periods and deactivated during inactive periods).

It should be emphasized that the injection of test light into each optical fiber links according to an intensity level pattern allows for both polarity testing and continuity testing on all optical fiber links. The use of an injection pattern based on intensity level has the advantage, compared to a pattern based on the spectral content of the optical signals, of allowing the use of an image detector that does not discriminate or otherwise capture the spectral content of the image. In some implementations, capturing intensity-only images may provide a better image resolution for the same or a lower cost.

It will be understood that the number of distinct connector surface images required to test the polarity and continuity of a multi-fiber cable link can depend on the number of fiber endfaces that the fiber inspection probe can view in one connector surface image and/or the number of tests to be performed (e.g., in FIG. 9, whether polarity testing with only the first source 26a is performed simultaneously or not with continuity and/or insertion loss testing involving the three sources 26a, 26b, 26c). For example, in one embodiment, three connector surface images may be necessary to test the polarity and continuity of 1×12 and 1×16 MPO cable links.

It should be noted that the source assembly configuration shown in FIG. 9 is provided for illustrative purposes only, as various other possible polarity and/or continuity testing configurations can be used, each of which involving a simultaneous or sequential injection of more, less and/or different test optical signals into a different combination of input ports of the source MFC 104. For example, certain configurations can be used for cost optimization and/or meeting specific requirements.

Of course, numerous modifications could be made to the embodiments described above without departing from the scope of the present disclosure.

What is claimed is:

1. A test method for determining a polarity of a multi-fiber cable link comprising a plurality of optical fiber links each connected between a first multi-fiber connector at a first end and a second multi-fiber connector at a second end, according to said polarity, the test method including:
    injecting test light into one or more of the optical fiber links via corresponding injection ports of the first multi-fiber connector, in accordance with a defined injection pattern;
    generating at least one polarity-testing image of the second multi-fiber connector in which test light exiting at least one of the optical fiber links through one or more exit ports of the second multi-fiber connector is imaged as one or more light spots in said polarity-testing image; and
    determining the polarity of the multi-fiber cable link based on a pattern of said one or more light spots in said polarity-testing image.

2. The method as claimed in claim 1, further comprising:
    generating at least one inspection image in which one or more optical fiber endfaces of the second multi-fiber connector are imaged and in which light spots from test light are absent; and
    determining respective positions of said one or more optical fiber endfaces in said inspection image; and wherein determining the polarity of the multi-fiber cable link comprises estimating an intensity level of light associated with each of said positions to determine therefrom the intensity pattern of said one or more light spots associated with said optical fiber endfaces.

3. The method as claimed in claim 1, wherein test light is injected into the optical fiber links in accordance with a defined intensity level injection pattern; and wherein the polarity of the multi-fiber cable link is determined based on an intensity pattern of said one or more light spots in said polarity-testing image.

4. The method as claimed in claim 1, wherein test light is injected into one or more of the optical fiber links in accordance with a defined injection pattern and a cyclic emission sequence comprising active periods during which said test light is active, and inactive periods during which said test light is inactive; and further comprising: detecting an inactive period of said test light during which light spots from test light are absent; and during said inactive period, generating at least one inspection image of the second multi-fiber connector in which one or more optical fiber endfaces of the second multi-fiber connector are imaged.

5. The method as claimed in claim 3, further comprising: determining a continuity of said optical fiber links of the multi-fiber cable link based on presence of light spots in the at least one polarity-testing image.

6. The method as claimed in claim 3, further comprising: generating at least one inspection image in which one or more optical fiber endfaces of the second multi-fiber connector are imaged and in which light spots from test light are absent.

7. The method as claimed in claim 6, further comprising: determining respective positions of said one or more optical fiber endfaces in said inspection image; and wherein determining the polarity of the multi-fiber cable link comprises estimating an intensity level of light associated with each of said positions to determine therefrom the intensity pattern of said one or more light spots associated with said optical fiber endfaces.

8. The method as claimed in claim 6, wherein an illumination source projects illumination light onto the second multi-fiber connector when generating said inspection image and wherein the illumination source is turned off for generating said polarity-testing image.

9. The method as claimed in claim 4, wherein test light is injected into each of the optical fiber links and wherein the method further comprises determining a continuity of said optical fiber links of the multi-fiber cable link based on presence of light spots in the at least one polarity-testing image.

10. The method as claimed in claim 4, further comprising: determining respective positions of said one or more optical fiber endfaces in said inspection image; and wherein determining the polarity of the multi-fiber cable link comprises estimating an intensity level and/or a spectral content of light associated with each of said positions to determine therefrom the pattern of said one or more light spots associated with said optical fiber endfaces.

11. The method as claimed in claim 4, wherein each of said active periods comprises a polarity-testing period during with test light is injected into a subset of one or more optical fiber links to define an injection pattern, and a continuity-testing period during which test light is injected in all optical fiber links.

12. An image capture device for determining a polarity of a multi-fiber cable link comprising a plurality of optical fiber links each connected between a first multi-fiber connector at a first end and a second multi-fiber connector at a second end, according to said polarity, the image capture device to be used with a source assembly configured to inject test light into one or more of the optical fiber links via corresponding injection ports of the first multi-fiber connector, in accordance with a defined injection pattern, the image capture device comprising:
    an image sensor configured to capture images of the second multi-fiber connector and configured to generate at least one polarity-testing image of the second multi-fiber connector in which test light exiting at least one of the optical fiber links through one or more of exit ports of the second multi-fiber connector is imaged as one or more light spots in said polarity-testing image, a pattern of said one or more light spots in said image being indicative of the polarity of the multi-fiber cable link.

13. The image capture device as claimed in claim 12, further comprising an image processor configured for analyzing the polarity-testing image to identify the polarity of the multi-fiber cable link based on said pattern of said one or more light spots in said polarity-testing image.

14. The image capture device as claimed in claim 12, wherein an image processor is configured for analyzing the polarity-testing image to identify the polarity of the multi-fiber cable link based on an intensity pattern of said one or more light spots in said polarity-testing image and determine a continuity of optical fiber links of the multi-fiber cable link based on presence of light spots in at least one polarity-testing image.

15. The image capture device as claimed in claim 14, further comprising a portable housing, an imaging system and an illumination source accommodated in the portable housing, and a probe tip configured to be coupled to the second multi-fiber connector to provide an optical path between the cable link under test and the imaging system.

16. The system as claimed in claim 15, further comprising a controller to control activation of the illumination source and so as to turn off the illumination source when capturing the at least one polarity-testing image.

17. A system comprising the image capture device of claim 12 and said source assembly.

18. The system as claimed in claim 17, wherein the source assembly comprises one or a plurality of distinct optical sources for generating the test light as one or more test optical signals.

19. The system as claimed in claim 17, wherein said image sensor comprises one of a charge-coupled device (CCD) sensor and a complementary metal-oxide-semiconductor (CMOS).

20. The system as claimed in claim 17, wherein said source assembly is configured to inject test light into the optical fiber links in accordance with a defined intensity level injection pattern; and wherein an intensity pattern of said one or more light spots in said polarity-testing image is indicative of the polarity of the multi-fiber cable link.

21. The system as claimed in claim 20, further comprising an image processor configured for analyzing the polarity-testing image to identify the polarity of the multi-fiber cable link based on an intensity pattern of said one or more light spots in the at least one polarity-testing image and determine a continuity of optical fiber links of the multi-fiber cable link based on presence of light spots in the at least one polarity-testing image.

22. The system as claimed in claim 21, wherein the image processor is further configured for determining respective positions of said one or more optical fiber endfaces on said at least one inspection image in which one or more optical fiber endfaces of the second multi-fiber connector are imaged and in which light spots from test light are absent; and determining the polarity of the multi-fiber cable link comprises estimating an intensity level of light associated with each of said positions to determine therefrom the intensity pattern of said one or more light spots associated with said optical fiber endfaces.

23. The system as claimed in claim 17, wherein test light is injected into one or more of the optical fiber links in accordance with a defined injection pattern and a defined cyclic emission sequence comprising active periods during which said test light is active, and inactive periods during which said test light is inactive; and wherein the image capture device further comprises an image processor configured for detecting an inactive period of said test light during which light spots from test light are absent; and a controller configured for, during said inactive period, triggering a capture of at least one inspection image of the second multi-fiber connector in which one or more optical fiber endfaces of the second multi-fiber connector are imaged.

24. The system as claimed in claim 23, wherein test light is injected into each of the optical fiber links and wherein the image processor is further configured for determining a continuity of said optical fiber links of the multi-fiber cable link based on presence of light spots in the at least one polarity-testing image.

25. The system as claimed in claim 23, wherein the image processor is further configured for determining respective positions of said one or more optical fiber endfaces on said inspection image; and for estimating an intensity level and/or a spectral content of light associated with each of said positions to determine therefrom the pattern of said one or more light spots associated with said optical fiber endfaces.

26. The system as claimed in claim 23, wherein each of said active periods comprises a polarity-testing period during with test light is injected into a subset of one or more optical fiber links to define an injection pattern, and a continuity-testing period during which test light is injected in all optical fiber links.

* * * * *